United States Patent [19]

Clark et al.

[11] Patent Number: 5,890,140

[45] Date of Patent: *Mar. 30, 1999

[54] SYSTEM FOR COMMUNICATING WITH AN ELECTRONIC DELIVERY SYSTEM THAT INTEGRATES GLOBAL FINANCIAL SERVICES

[75] Inventors: Barry Alan Clark, Rutherford, N.J.; John D'Onofrio, Staten Island, N.Y.

[73] Assignee: Citibank, N.A., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 478,053

[22] Filed: Jun. 7, 1995

Related U.S. Application Data

[62] Division of Ser. No. 392,270, Feb. 22, 1995, abandoned.

[51] Int. Cl.⁶ ........................................ G06F 17/00
[52] U.S. Cl. ............................. 705/35; 395/239
[58] Field of Search .................... 364/401, 404, 364/405, 406, 408; 395/235, 239, 242, 243; 380/24, 49; 705/35

[56] References Cited

U.S. PATENT DOCUMENTS

| | | |
|---|---|---|
| 3,596,256 | 7/1971 | Alpert . |
| 3,727,186 | 4/1973 | Stephenson et al. . |
| 3,833,885 | 9/1974 | Gentile et al. . |
| 3,852,571 | 12/1974 | Hall et al. . |
| 3,938,090 | 2/1976 | Borison et al. . |
| 3,956,615 | 5/1976 | Anderson et al. . |
| 4,023,013 | 5/1977 | Kinker . |
| 4,025,760 | 5/1977 | Trenkamp . |
| 4,032,931 | 6/1977 | Haker . |
| 4,075,460 | 2/1978 | Gorgens . |
| 4,091,448 | 5/1978 | Clausing . |
| 4,114,027 | 9/1978 | Slater et al. . |
| 4,186,438 | 1/1980 | Benson et al. . |

(List continued on next page.)

FOREIGN PATENT DOCUMENTS

| | | |
|---|---|---|
| 1087313 | 10/1980 | Canada . |
| 1138994 | 1/1983 | Canada . |
| 2025748 | 3/1991 | Canada . |
| 2069955 | 6/1991 | Canada . |
| 1311732 | 12/1992 | Canada . |
| 0003756 | 9/1981 | European Pat. Off. . |
| 0014313 | 5/1983 | European Pat. Off. . |
| 0033833 | 2/1984 | European Pat. Off. . |
| 0020507 | 1/1986 | European Pat. Off. . |
| 0072183 | 6/1988 | European Pat. Off. . |
| 0348959 | 1/1990 | European Pat. Off. . |

(List continued on next page.)

OTHER PUBLICATIONS

D.W. Davies, et al., "Security For Computer Networks," 2ⁿᵈ Ed., 1994; pp. 289–297.

"The EFT Sourcebook", pp. 35–40, Tables 1–4, J. Levy, Phillip Publishing Inc., 1988.

"Discovering Direct Access" manual, pp. 1–88, Citibank, N.A.,, 1987.

(List continued on next page.)

*Primary Examiner*—Thomas Peeso
*Attorney, Agent, or Firm*—George T. Marcou; Kilpatrick Stockton LLP

[57] ABSTRACT

A system for communicating with a global electronic delivery system that integrates a plurality of financial services provided at different geographical locations and in different time zones, and delivery such services directly to a customer facility at any time requested by the customer. The customer connects to the system whenever desired to access each of the services, and the delivery system stores and routes messages between the customers and each of the service providers at the respective times when the customers' facilities and the service providers' facilities are operative. The communications system can comprise a stand-alone personal computer, a local area network, and/or a mainframe computer. The communicates system also includes a variety of security functions that provide different levels of access to the services for different customers.

46 Claims, 31 Drawing Sheets

U.S. PATENT DOCUMENTS

| | | |
|---|---|---|
| 4,319,336 | 3/1982 | Anderson et al. . |
| 4,493,021 | 1/1985 | Agrawal et al. . |
| 4,536,647 | 8/1985 | Atalla et al. . |
| 4,567,359 | 1/1986 | Lockwood . |
| 4,688,170 | 8/1987 | Waite et al. . |
| 4,727,243 | 2/1988 | Savar . |
| 4,734,858 | 3/1988 | Schlafly . |
| 4,799,156 | 1/1989 | Shavit et al. ............... 364/401 |
| 4,823,264 | 4/1989 | Deming . |
| 4,858,121 | 8/1989 | Barber et al. . |
| 4,903,201 | 2/1990 | Wagner .................. 364/408 |
| 4,914,587 | 4/1990 | Clouse .................... 364/408 |
| 4,933,971 | 6/1990 | Bestock et al. . |
| 4,943,995 | 7/1990 | Daudelin et al. . |
| 4,972,463 | 11/1990 | Danielson et al. . |
| 4,989,141 | 1/1991 | Lyons et al. . |
| 4,992,940 | 2/1991 | Dworkin . |
| 5,025,373 | 6/1991 | Keyser, Jr. et al. ............ 364/408 |
| 5,038,284 | 8/1991 | Kramer . |
| 5,124,909 | 6/1992 | Blakely . |
| 5,157,717 | 10/1992 | Hitchcock . |
| 5,168,446 | 12/1992 | Wiseman ................... 364/408 |
| 5,195,130 | 3/1993 | Weiss et al. . |
| 5,202,826 | 4/1993 | McCarthy . |
| 5,220,501 | 6/1993 | Lawlor et al. . |
| 5,231,571 | 7/1993 | D'Agostino . |
| 5,262,942 | 11/1993 | Earle .................... 364/408 |
| 5,265,033 | 11/1993 | Vajk et al. . |
| 5,268,838 | 12/1993 | Ito ..................... 364/401 |
| 5,287,270 | 2/1994 | Hardy et al. . |
| 5,305,200 | 4/1994 | Hartheimer et al. ............ 364/408 |
| 5,351,186 | 9/1994 | Bullock et al. . |
| 5,424,938 | 6/1995 | Wagner et al. ............... 364/408 |
| 5,436,966 | 7/1995 | Barrett et al. ............... 379/265 |
| 5,448,471 | 9/1995 | Deaton et al. ............... 364/401 |
| 5,457,797 | 10/1995 | Butterworth et al. ........... 395/650 |
| 5,497,317 | 3/1996 | Hawkins et al. .............. 364/408 |

FOREIGN PATENT DOCUMENTS

| | | |
|---|---|---|
| 0107865 | 3/1990 | European Pat. Off. . |
| 0117124 | 4/1991 | European Pat. Off. . |
| 75/4548 | 7/1975 | South Africa . |
| 80/0109 | 1/1980 | South Africa . |
| 80/0111 | 1/1980 | South Africa . |
| 83/1146 | 2/1983 | South Africa . |
| 85/4878 | 6/1985 | South Africa . |
| 92/8773 | 11/1992 | South Africa . |
| 1324616 | 7/1973 | United Kingdom . |
| 2079504 | 3/1984 | United Kingdom . |
| 2118341 | 5/1985 | United Kingdom . |
| 2159644 | 2/1988 | United Kingdom . |
| 2271002 | 3/1994 | United Kingdom . |
| 2251098 | 10/1994 | United Kingdom . |
| WO 91/09370 | 6/1991 | WIPO . |

OTHER PUBLICATIONS

Article "The CIRRUS Banking Network", D. Gifford, et al., pp. 798–807, Communications of the ACM, vol. 28, N. 8, Aug. 1985.

Article "8 Banks and Thrifts in 3 States Launch Video Banking Service", A. Newman, Jr., American Banker, no date available.

DIALOG text of article "Viewtron Entering Pittsburgh in Deal with Dollar Bank", D. Tyson, Pittsburgh Press American Banker, Aug. 12, 1985.

DIALOG text of article "NBD Offers electronic Highway for Netwrok of Shared ATMs", R. Garsson, American Banker, Apr. 11, 1984.

DIALOG text of article "Home Bank System in Micro Friendly", R. Garsson, American Banker, p. 1, Jul. 13, 1983.

Wurman, et al.; The Wall Street Journal Guide To Understanding Money & Markets; Access Press, Ltd., 1990.

Freund, Wm C.; Trading Stock Around the Clock: The Future Growth of Global Electronic Markets; California Management Review, v34, n1, p. 87(16); Fall, 1991.

Howard, B.; the Trade: Technology Aims to Take The Final Step; Institutional Investor, v25, n1, p. 15, Jan. 1991.

FIG. 10
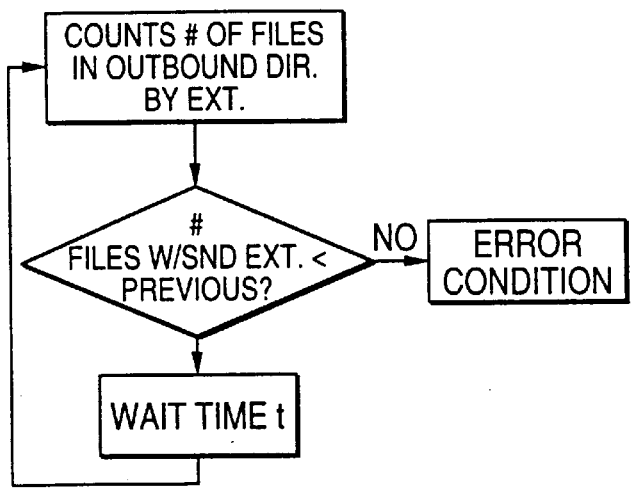
CUSTOMER SYSTEM:
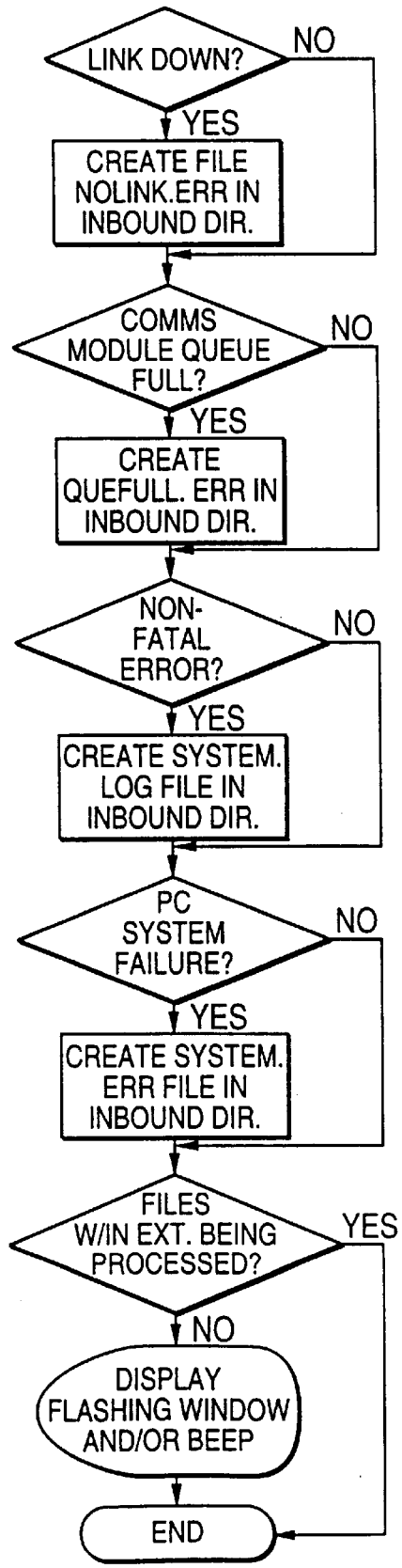
PC TRANSPORT PROGRAM

FIG. 16
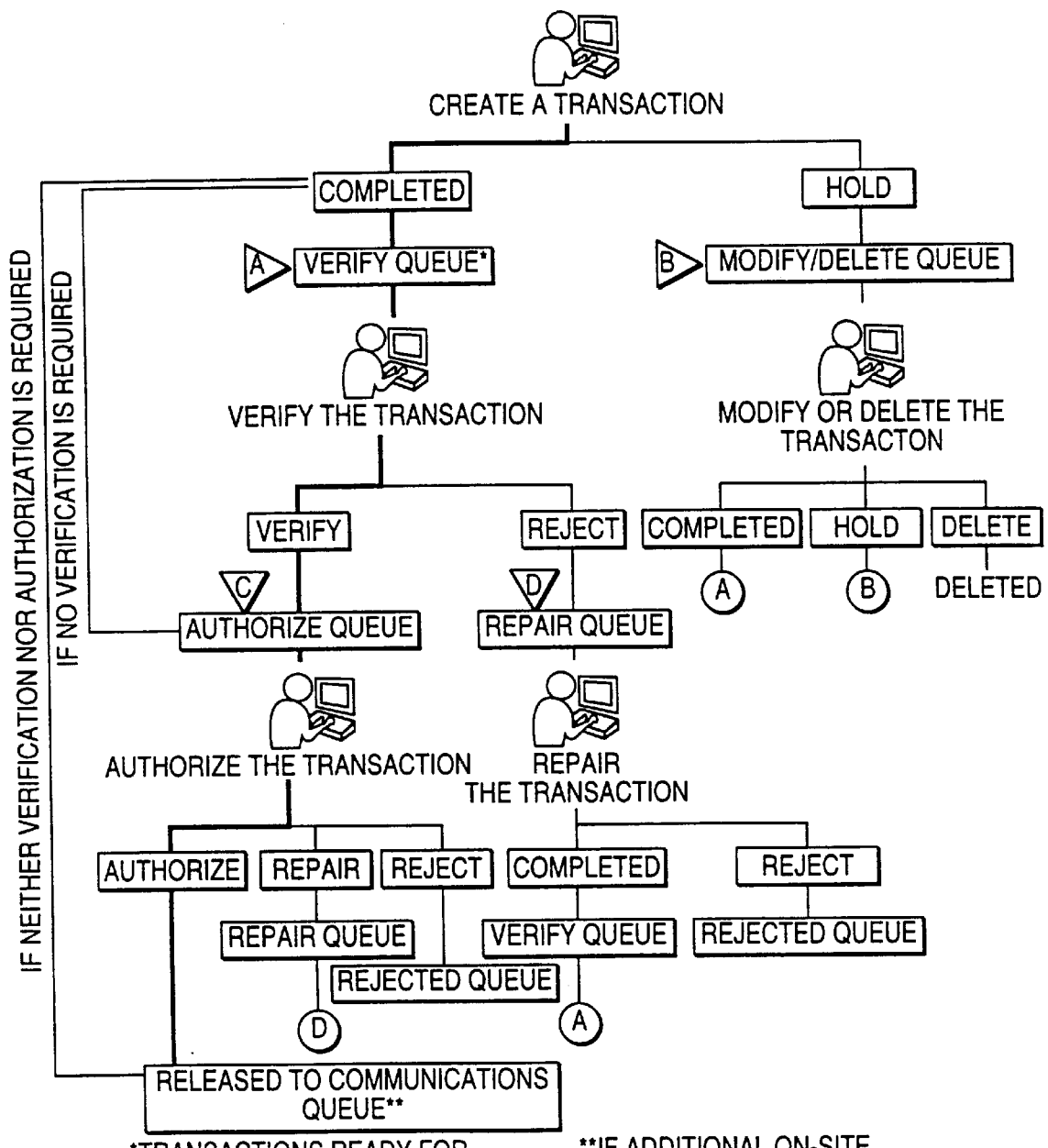
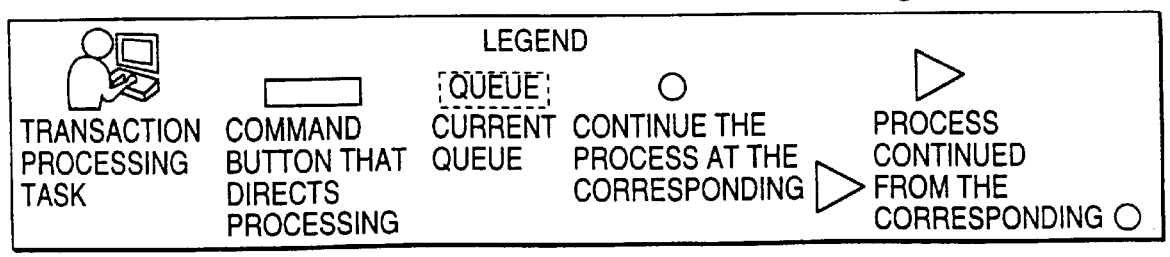

FIG. 17

Create Selection

Format:
- ○ FreeFormat ①
- ○ PreFormat
- ◉ Group Format

Transaction type ②
- ACN Credit
- ACN Debit
- Fed Draw Down
- Customer Transfer
- Bank Transfer PreFormat Groups ③
- CUFTGBP
- CUFTYEN
- FEDFT
- Monthly Fixed

[Search]
[OK]
[Cancel]

Sort PreFormats by ④
- ◉ Type   ○ Currency
- ○ Reference   ○ Beneficiary

Headquarters - Asian/Pacific group ⑤

PreFormat Reference ⑥

⑦

| Type | Reference | CCY | Beneficiary |
|------|-----------|-----|-------------|
| ACNC | CGL 2000000000000083 | USD | GLOBAL ELECTRONICS |
| Book | CGL 2000000000000187 | USD | INTERNATIONAL AUTOS |
| CNIP | CGL 2000000000000899 | USD | TRANSNATIONAL FOODS |
| CuTx | CGL 2000000000000205 | GBP | FEDERAL COMPUTERS |
| CuTx | CGL 2000000000000832 | DEM | TRANSWORLD MINING |
| CuTx | CGL 2000000000000000 | AUD | NATIONAL METALS |

FIG. 20

Summary Authorize Selection

Display ①
- ◉ Local
- ○ Remote

Sort by ②
- ◉ Type    ○ Reference    ○ Currency
- ○ Amount  ○ Status       ○ Value Date

Reference ③
[          ]

| Type | Reference | Date | CCY | Amount | Queue |
|------|-----------|------|-----|--------|-------|
| ACNC | CGL200000000000001 | 4/19/99 | USD | 1,234.56 | Auth 1 |
| ACND | CGL200000000000002 | 4/19/99 | USD | 2,345.67 | Auth 1 |
| CuTx | CGL200000000000004 | 4/19/99 | DEN | 21,987.65 | Auth 1 |
| FdDr | CGL200000000000003 | 4/19/99 | USD | 34,567.89 | Auth 1 |

④

Beneficiary's Name    : TERVUREH PIPES INC.
Beneficiary's Account : 33857578

⑤

[Authorize] [Repair] [Reject] [View] [Unlock] [Cancel]

FIG. 23

Create Transactions

Transaction Type: RP - Receive v/s Payment

Instrument Type: EQTY - Equities

Portfolio: US SECURITIES

| Custody Location | Custody Account | Account Description |
|---|---|---|
| NEW YORK | 089417 | GLOBAL SEC. INC - NEW YORK |

Settlement Location: NEW YORK

OK    Cancel

FIG. 24

Citibanking Securities - Create Transaction - Receive v/s Payment

① Transaction Type Code: RP    Instrument Type: EQTY    Custody Location: NYK    Settlement Location: NYK ② Customer Reference No.:
   Trade Date: 05/23/94
   CB Transaction Reference No.:
   Settlement date: 05/31/94

③ Safekeeping Account Number: 089417
   Security ID Code: L CUSP
   Security ID Number: L
   Security Description: L
   Counterparty/Broker Code: L
   Counterparty/Broker Name: L
   Quantity:
   Settlement Currency: L USD
   Settlement Amount:

④ Clearing Account Code: L

[Completed]  [Copy]  [Hold]  [Print]  [Reset]  [Cancel]

USER1 | May 23rd 6:30

FIG. 28

*Report Viewer*

Reports  Edit  View  Preferences  Window  Help

Select  Edit  Print  Pacap  Summ  Detail  Find  Again  Go to  Exit  Help

— Assets By Location (Our Securities A)

11/20/94 13:02
StatDate: 03/07/99  Account: 888111  Global 5

- a Stat Date — Security Desc
- b SK Account — Security Desc
- c Customer — Security Type
- d Security ID — Related ID
- e Center — Branch a 03/07 94
b 888111  ADAMS CNTY COLO SCH

— L/C Balance Summary (lcbalsum920)

Created: 20 NOV 94  Page: 1 of 8
L/C Balance Summary (lcbalsum920)
GLOBAL TRADE INC.
As of 09/20/93  Customer ID: 3367870667

| Customer Reference | Issue Date | Expd Date |
|---|---|---|
| Import | | |
| 4445657774 | 08/22/99 | 10/3 |
| 4445658021 | 08/22/99 | 10/3 |

MY CUSTOM REPORT

| Country Code | Currency Description |
|---|---|
| FR | FRENCH FRANC |
| GN | GUINEA FRANC |
| ID | RUPIAH |
| ET | ETHIOPIAN BIRR |
| IF | IRISH POUND |

— Account Statement (GLOBCASHMAR2_1)

Created: 20 NOV 94  Page: 1 of 10
Account Statement (GLOBCASHMAR2-10)
Enterprise 1000111111  GLOBAL CASH ENTERPRI
Branch     102         Citibank Melbourne
Customer   0000123456  GLOBAL CASH INC.
Account    111123

| Date | Bank Reference | Cust Reference |
|---|---|---|
| 2 Mar 94 | Opening Balance FUNDS TRANSFER | |

Ready                                              USER1|Nov 20th 16:26

SYSTEM FOR COMMUNICATING WITH AN ELECTRONIC DELIVERY SYSTEM THAT INTEGRATES GLOBAL FINANCIAL SERVICES

This application is a division of application Ser. No. 08/392,270 filed Feb. 22, 1995, now abandoned.

NOTICE OF COPYRIGHTED MATERIAL IN DISCLOSURE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to financial transaction systems, and in particular, to a system for communicating with a delivery system that integrates and delivers plurality of global financial services to customers.

2. Description of the Prior Art

Businesses, particularly large corporations, use a variety of financial services provided by financial institutions, including banks. For example, a typical business may require financial products and services of several types, including payments, cash management, securities, trade finance, custody, foreign exchange, and loans, to support its day-to-day operations.

Each of these products and services has many different subcategories. For example, cash management services include funds transfers, money market transactions, stop payment orders, and account balance and activity inquiries. Securities services include securities trading, and services to investors and issuers of securities. Trade finance services include letters of credit, money collection for trade transactions, and trade activity and payment inquiries.

Over the last decade, a number of electronic delivery systems were provided to enable corporate customers to initiate banking transactions and retrieve information from terminals located on the customer's premises. Due to limitations in technology, these access services were typically unique to each product or geographic region. This usually meant that neither the bank nor its customers could directly receive a consolidated picture of the customer's global business and financial relationships.

Prior to the present invention, electronic delivery systems were available on a global basis only through a large number of separate electronic delivery systems located around the world. For example, the largest U.S. bank, Citibank, currently has many separate electronic delivery systems in the United States to provide its corporate customers with cash management, securities, and trade services. These separate electronic delivery systems cover only the United States region.

To engage in overseas financial activities, it was necessary for a customer to communicate with processing systems in remote geographic regions using separate electronic delivery systems. For example, Citibank has electronic delivery systems for accounts in Latin America that provide cash management and securities services for the Latin America region. In Europe, Citibank has electronic delivery systems that provide cash management and securities services throughout the European countries. And in the Asia-Pacific region, Citibank has electronic delivery systems that provide cash management, securities, and trade services to that region. Many other electronic delivery systems exist throughout other geographic regions of the world that offer some or all of the financial services needed to support international business operations in those regions.

Communicating using a large number of different electronic delivery systems throughout the world to engage in global finance activities has significant disadvantages. The processing systems in other countries often operate only during normal working hours in the local region. Thus, for example, a U.S. business making a funds transfer from its bank account in Asia might be required to connect to the appropriate processing system in the Asia-Pacific region outside normal working hours in the United States to make the transaction.

Businesses were also required to select and access a particular electronic delivery system to make a given transaction or inquiry, depending on the geographic region involved and the type of transaction or inquiry. This placed a significant logistical burden on those businesses and made global banking less attractive to many customers.

In addition, businesses that required access to multiple financial products (i.e., cash-securities, cash-trade, or cash-securities-trade) or to multiple geographies had to have multiple delivery systems for the separate products. This was burdensome for the customer as it required different sign-on sequences, passwords, training, and hardware platforms.

SUMMARY OF THE INVENTION

It is thus an object of the present invention to provide an electronic delivery system that provides a customer with access to a plurality of dissimilar computerized financial services.

It is a further object of the present invention to provide a system that can remain operable 24 hours a day, 365 days a year, to allow access to financial services at all hours of the day anywhere in the world.

It is a further object of the present invention to provide a system that provides continued operation at a backup site in case of a major disaster at the primary operational site.

It is a further object of the present invention to provide an electronic delivery system with a high degree of access control for improved security.

It is a further object of the present invention to provide a message-based delivery system that supports the required flow of a financial institution's business messages.

It is yet a further object of the present invention to provide a system that provides a customer with machine-processable data for facilitating manipulation of the data, integrating the data into customer systems, and generating custom reports, at the customer's workstation.

It is another object of the present invention to provide a friendly graphic user interface in a single or multiple user environment for initiating transactions, retrieving data, and communicating with on-line processors.

It is a further object of the present invention to provide a delivery system that integrates a number of different customer systems through the availability of multiple connectivity options, including CPU-CPU connections, CPU-PC connections, single user workstations, and multi-user LANs.

Additional objects, advantages and novel features of the invention will be set forth in the description which follows, and will become apparent to those skilled in the art upon reading this description or practicing the invention. The objects and advantages of the invention may be realized and attained by the appended claims.

The present invention is summarized as an electronic delivery system that integrates interactive financial services to allow access to multiple financial products from a single location. The system is primarily used to provide financial services to business customers, and particularly to businesses with international financial needs. The system is an improvement over the prior art where global finance customers were required to access separate electronic delivery systems depending on the type of transaction and the geographic region involved.

The present invention provides an electronic delivery system that seamlessly interlinks the myriad of existing access services to provide comprehensive financial transaction services from single or multiple customer locations. The system provides "single window" access for a large number of financial products, as well as for multiple geographic regions. For example, a bank may have separate electronic delivery systems that provide cash management, securities, and trade products to its customers, and may have a number of these systems located throughout the world to serve different geographic regions. The present invention delivers the services from all of these existing systems to the customer's work site using a single interface. The integration of data provided by the delivery system empowers the customer with tools to manage their business in new and better ways, such as obtaining a global view of the customer's accounts, manipulating data into customized reports, remotely authorizing transactions, and so forth.

BRIEF DESCRIPTION OF THE DRAWINGS

The present invention will become more clearly appreciated as the disclosure of the present invention is made with reference to the accompanying drawings wherein:

FIG. 10 is a flow chart of an error handling process for the PC-Transport of the present invention.

FIG. 16 is a diagram showing the steps for processing a cash transaction at the customer facilities.

FIG. 17 is an illustration of a screen display for creating a cash transaction.

FIG. 20 is an illustration of a screen display for authorizing a cash transaction.

FIG. 23 is an illustration of a first level screen display for creating a securities transaction.

FIG. 24 is an illustration of a second level screen display for creating a securities transaction.

FIG. 28 is an illustration of a screen display showing reports from each of the cash, securities, and trade activities.

DETAILED DESCRIPTION OF THE PREFERRED EMBODIMENT

Reference will now be made in detail to a preferred embodiment of the invention, an example of which is illustrated in the accompanying drawings.

Figure 1:
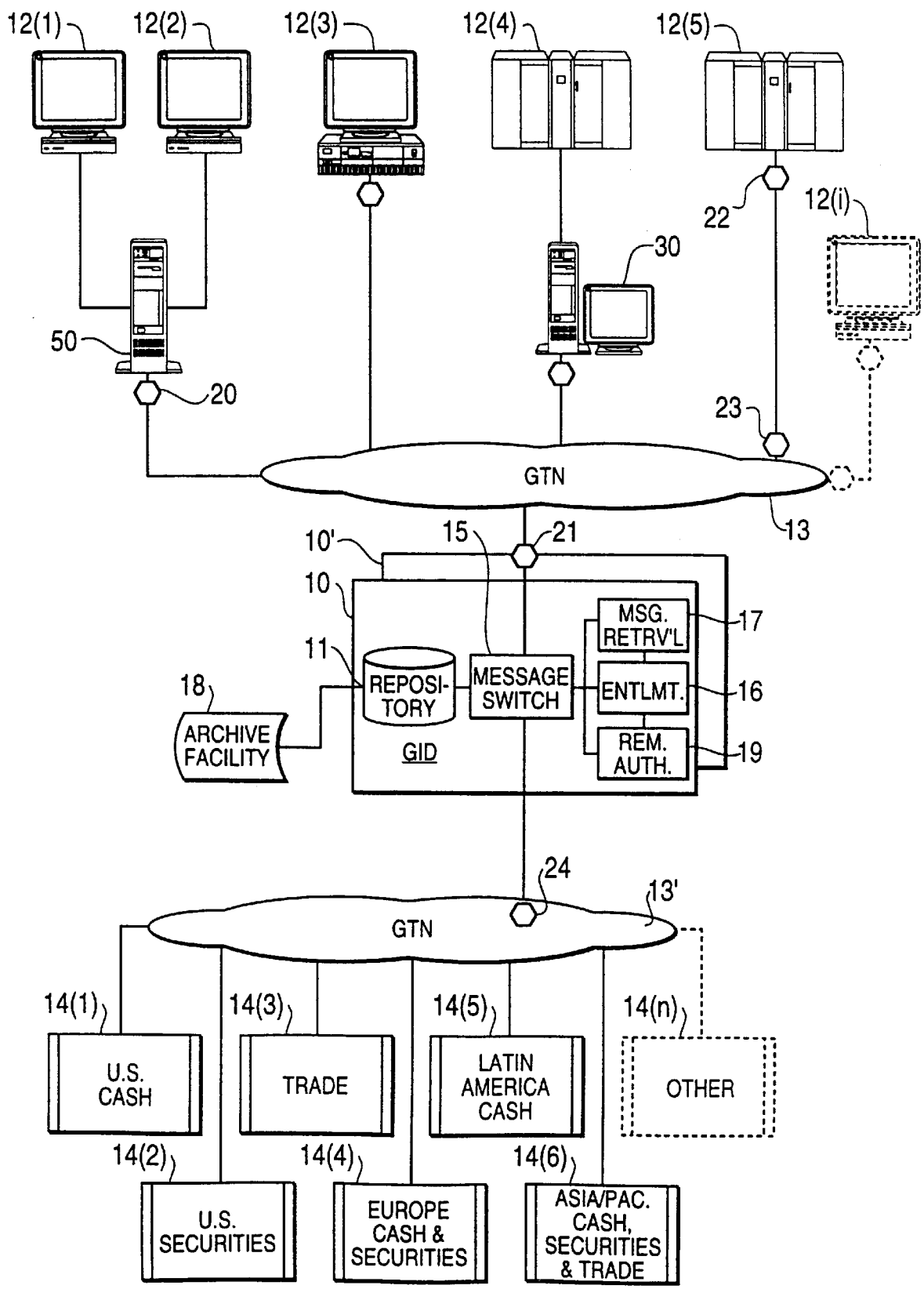
FIG. 1 is a schematic diagram providing a general overview of the main components of the present invention.

FIG. 1 provides a general overview of the main components of the present invention. The system includes a global interface device (GID) 10, a backup GID 10', a message repository 11, one or more customer facilities (CFs) 12(1,2, . . . i), a global telecommunications network (GTN) 13, 13', and a plurality of on-line transaction processors (OLTPs) 14(1,2, . . . n). The OLTPs 14(1,2, . . . n) may be located in a number of geographic regions around the world and may provide a variety of different financial services, including, but not limited to, cash management, securities, and trade finance services.

The GTN 13, 13' provides a proprietary, global connecting medium between the GID 10 and the OLTPs 14(1,2, . . . n), as well as between the customer facilities 12(1,2, . . . n) and the GID 10. In a preferred embodiment, the GTN is a private X.25 packet switch data network using permanent or switched virtual circuits as an end-to-end control mechanism through the network.

The Global Interface Device (GID)

The GID 10 provides a single point of access between the customer facilities 12(1,2, . . . n) and the OLTPs 14(1,2, . . . n). The GID 10 includes a processing system or message switch 15 that forwards and receives messages (e.g., transaction instructions, event and status messages, and product inquiries) between the GID 10 and the OLTPs 14(1,2, . . . n), as well as between the GID 10 and the CFs 12(1,2, . . . i).

The GID 10 has an entitlement subsystem 16 that controls who can access different features of the system. The entitlement subsystem 16 uses a series of log-on processes to control initial entry into the system. Also, associated with each user of the system is a set of specific entitlements stored in the subsystem 16 that limit the kinds of transactions and inquiries the user can make in the system against particular accounts and locations.

A message retrieval subsystem 17 controls retrieval of messages from the repository 11 of the GID 10 by limiting the kinds of information each user can retrieve from the system, as defined and controlled by the entitlement subsystem 16. The message retrieval subsystem 17 permits a broad range of retrieval options, including the retrieval of messages fitting a particular transaction type, class, branch, account, time, data, status, and so forth.

The repository 11 is a database within the GID 10 that stores all messages sent through the GID 10. Transaction instruction messages sent from the CFs 12(1,2, . . . i) to the GID 10 are stored in the repository 11 and are queued for onward transmission to the appropriate OLTPs 14(1,2, . . . n) at a permissible time (i.e., during normal operating hours of the OLTP). Also, messages received from the OLTPs 14(1,2, . . . n) can be either stored in the repository 11 while awaiting retrieval by the customer at the customer facility 12(1,2, . . . n), or proactively queued to the customer facility for delivery.

A remote authorization subsystem 19 allows a customer operating in different geographic locations to control the flow of transaction instructions. For example, CF 12(1) in location A can locally initiate a funds transfer transaction requiring secondary approval from CF 12(4) in location B.

The transaction is completed only after an authorization message is sent to the GID 10 from location B through the remote authorization subsystem 19.

A backup global interface device (GID) 10' is linked to the primary GID 10 and the GTN 13, 13' to provide continued operation of the electronic delivery system in the event of a power outage or other major disaster in the primary operational site. The backup GID 10' is essentially a mirror image of the primary GID 10. The primary GID 10 and backup GID 10' are network connected so that the backup GID 10' is in constant communication with the primary GID 10 and maintains the same data, entitlements, stored messages, etc. as the primary GID 10.

Figure 2:
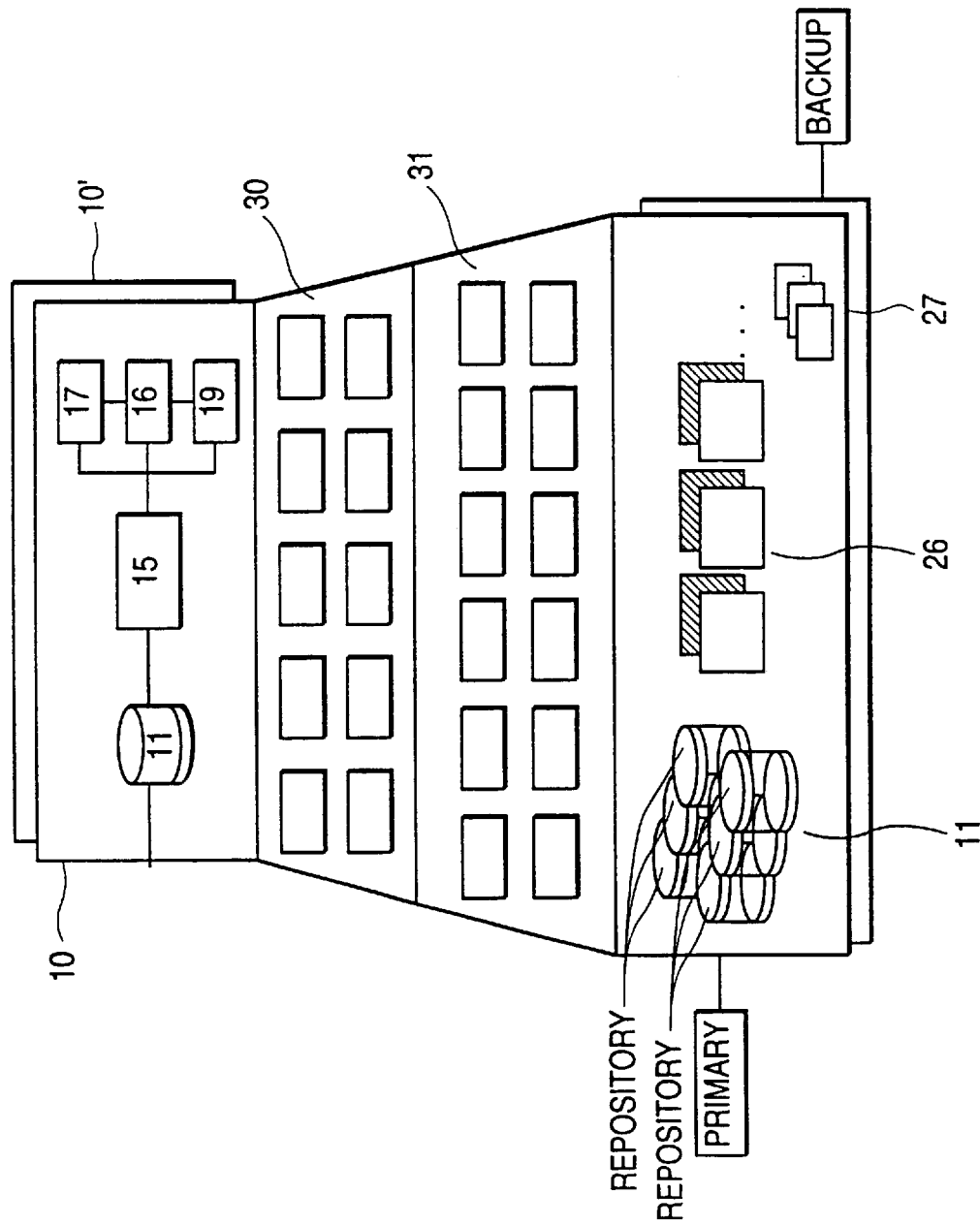
FIG. 2 is a schematic diagram of the global interface device of the present invention.

The hardware of each of the GIDs 10,10' includes a disk repository 11, a plurality (e.g., 8) of CPU processors 26, and communications controllers 27 (see FIG. 2). This hardware can, for example, be provided by the TANDEM Corp.

Supporting software for the GIDs 10,10' can, for example, be provided by LOGICA Corp.'s Transaction Director ("LTD") software and TANDEM Corp.'s operating systems and subsystems software. Specifically, the GIDs 10,10' will operate according to the present invention using LOGICA Corp. software components (represented by level 30 in FIG. 2) currently available under the following proprietary trade names: LTD Store and Forward Core; LTD LU6.2 Interface; LTD X.25 Interface; LTD Security sub-system; LTD Entitlement sub-system; LTD SQL Repository sub-system; LTD Enhanced Broadcast sub-system; LTD Remote Authorization sub-system; LTD Message Enrichment (Base number) sub-system; and LTD RDF Site Support. And using TANDEM Corp. software components currently available under the following proprietary trade names: Guardian Operating System; SafeGuard Control sub-system; Pathway; NonStop SQL; Remote DataBase Facility (RDF); SNAX/XF; SNAX/APC; TLAM; X25AM X.25 Access Method; Programmatic Network Administrator (PNA); Basic Operations Management Package; and Object Monitoring Facility (represented by level 31 in FIG. 2).

Other commercially available operating systems and software components will be recognized by those skilled in the art to support the operations of the GID 10,10', as described and claimed herein. The above products available from TANDEM Corp. and LOGICA Corp. are mentioned by way of example only.

The above described subsystems and components of the GID 10 can provide access to the electronic delivery system of the present invention 24 hours a day, 365 days a year. That is, a customer has access to the messages stored in the repository 24 hours a day, and can send instructions and inquiries to the GID 24 hours a day for immediate or delayed forwarding to the appropriate OLTPs 14(1,2, . . . n).

The repository 11 also maintains a record of all messages sent through the GID 10. After a predetermined period of time (e.g., 45 days) the messages are moved to a secondary archive facility 18 (see FIG. 1) connected to the repository 11. This provides the system with full capability to audit and reconstruct records when necessary.

Encrypting devices 20–23 are provided to ensure data integrity and security. Two types of data encryption are used in the delivery service. The first is link-level encryption and is used in the delivery system for leased line connections between mainframe CFs 12 (i.e., CPU-CPU or PC-Transport) and the GID 10. Link-level encryption devices (shown as elements 22 and 23 in FIG. 1) are available from a variety of communications product vendors, such as, for example, the encryption device available from CYLINK, Inc. under the proprietary tradename CIDEK-LS.

In the link-level encryption configuration, data is encrypted from its point of origin within a customer environment, up to its point of entry into the GTN 13 (the GTN 13 preferably has its own internal encrypted paths).

Software provided at the GID 10 can verify the caller's (X.121) address during the logon/entitlement sequence.

The second type of encryption capability is referred to as session-level encryption and is provided for the asynchronous dial-in connections (i.e., the customer work stations) to the GID 10. Session-level encryption devices (shown as element 20) can be purchased from a variety of vendors, including the encryption device available from Information Resource Engineering, Inc. under the proprietary tradename Model No. 96NX, and the encryption device available from Communications Devices, Inc. under the proprietary tradename Model No. RSD/E.

Session-level encryption devices encrypt customer data, from its point of origin within the customer environment, throughout the GTN 13, with the data being decrypted within the bank environment at a central encryption control system 21 just prior to processing at the GID 10. Software within the GID 10 determines if customer data requiring encryption has been forwarded on a link-encrypted path. If not, the customer is not permitted to establish communications with the GID 10.

The Customer Facilities

The customer facilities 12(1,2, . . . i) include each of the system or systems on the customer's site that accepts messages from and transmits messages to the GID 10. The customer facilities can be in a variety of forms, including multi-user local area networks (LANs) 50 with multiple workstations 12(1),(2), single user workstations 12(3), and/or mainframe computers 12(4),(5). In the case of mainframe computer CFs 12(4),(5), connection to the GID 10 is either through a PC transport 30 (shown between the CF 12(4) and the GID 10), or through a direct (CPU-CPU) connection (shown between the CF 12(5) and the GID 10). The direct (CPU-CPU) connectivity option for CF 12(5) uses different communications software than the other three connectivity options for CFs 12(1–4), as described below.

Figure 3:
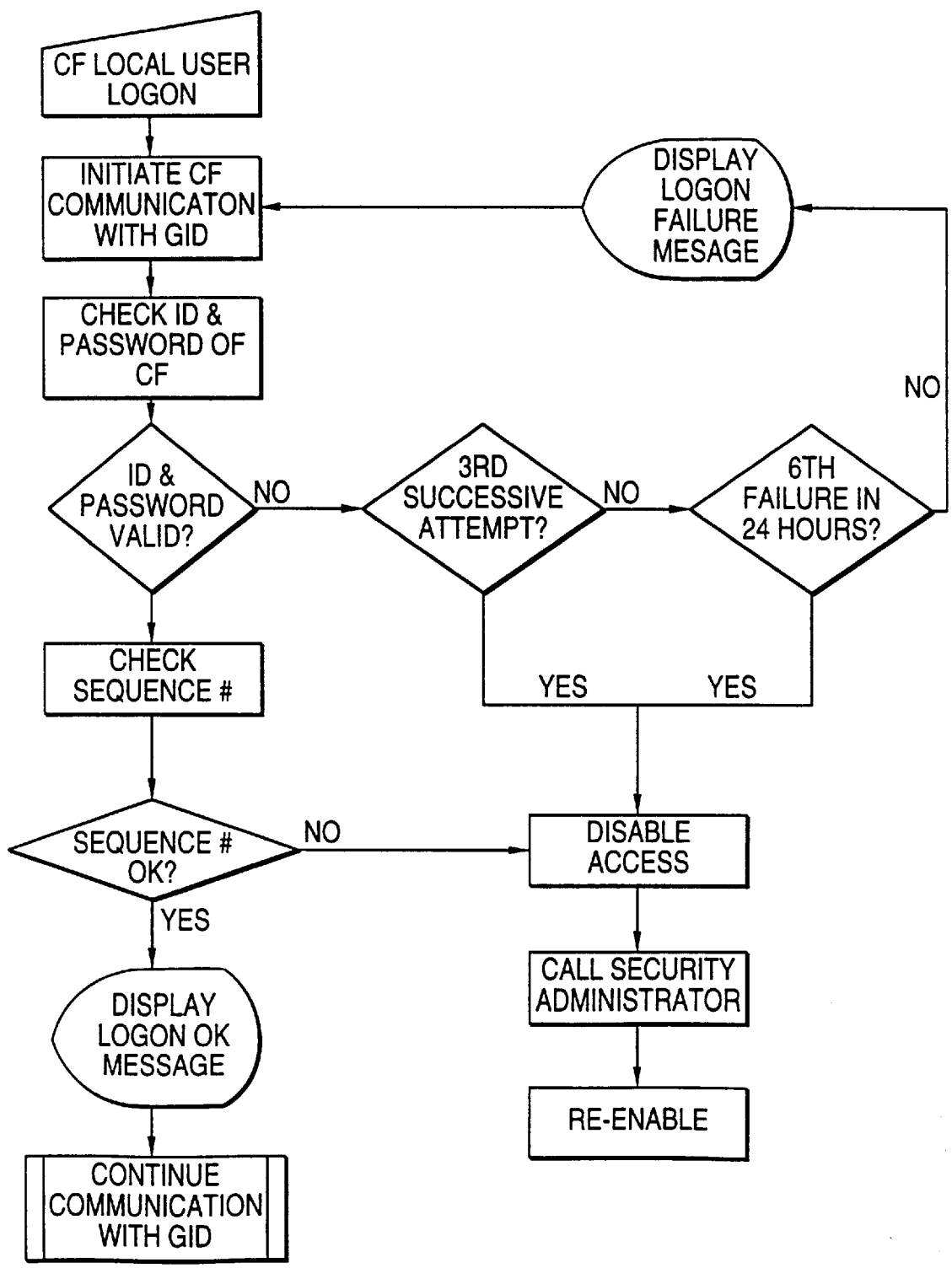
FIG. 3 is a flow chart of a process for initiating communication with the global interface device.

As shown in the flow chart of FIG. 3, the log-on sequence of the present invention includes a two-tier sign-on process; first at the local user level, and second after communication has been initiated with the GID 10. Both tiers of the sign-on process must be successful before messages can be communicated between the CFs 12(1,2, . . . i) and the GID 10.

The CFs 12 can be used to initiate instructions to the financial institution to perform various functions such as transferring funds, moving securities, initiating a letter of credit, etc., and can route the instructions to the appropriate service. The CFs 12 can also receive and integrate information such as account statements from the different services and/or different locations, import instructions and export information from different locations, import instructions and export information from and to other systems, or create customized reports by using a variety of tools provided to the customer. The CFs 12 use a local database to integrate the data associated with instructions, statements, and other information such as tables or libraries used at the workstation.

The CFs 12(1–4) are provided with software to facilitate transaction initiation and product inquiries. The software also generates customized reports from the information contained in the data of the messages forwarded and retrieved from the GID 10, as well as in the data keyed or otherwise entered directly into the CFs 12(1–4). The software contained in the CFs 12(1–4) and the details of a LAN installation are described in detail below.

The Messages

Figure 4:
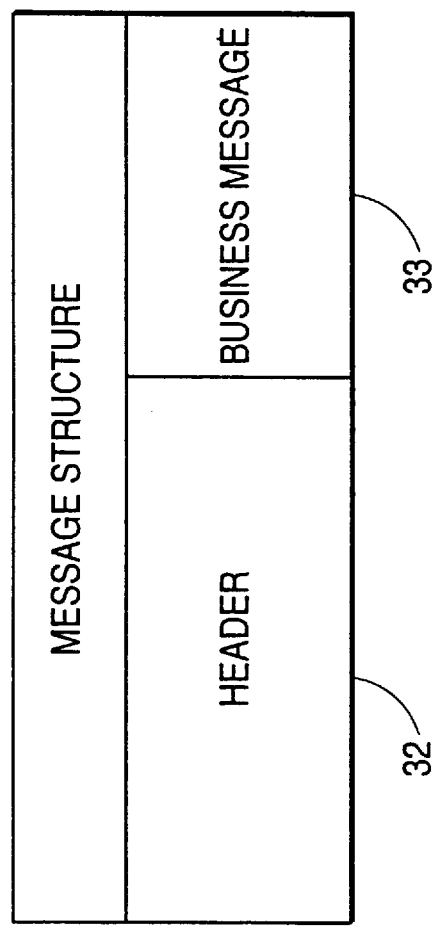
FIG. 4 is a schematic of the data structure of messages used in the electronic delivery system of the present invention.

The messages transferred through the system (i.e., transaction instruction, product inquiry, and status, event and service messages) contain essentially two parts, as shown in FIG. 4. First, a header portion 32 of each message contains a series of defined data elements that identify the customer, user, location, branch, account, message type, date, time, and so forth. Second, a main body (business or service message) portion 33 of the message contains the specific instruction, inquiry, status, or event information intended to be sent between the OLTPs 14(1,2, . . . n) and the CFs 12(1,2, . . . i), or between the CFs and the GID 10. The header and main body portions of the messages are in a structured format, either adhering to industry standards (e.g., message formatting standards managed by the Society for Worldwide Interbank Financial Telecommunications ("S.W.I.F.T.")), or meeting administrative requirements of the delivery system.

Messages are stored in the repository 11 in a relational database environment according to the data elements in the message header portion. The elements in the header portion of the messages are decoded and used to populate the repository 11. The messages can be located and retrieved upon request from the customer terminal 12 based on the relational position within the repository 11.

A customer can select messages to retrieve from the repository 11 using a formatted message against the elements in the message header. For example, a customer facility can limit the message request to only certain message types for a particular account, date, time, etc. The main body portion of the messages is not decoded within the GID 10, but is stored in relation to the header elements as one complete block of data.

The header portion 32 of the messages preferably begins with a message type field and ends with an end of header tag field. In between these two fields, the header will contain any or all of the following information fields: authentication code, account ID, remote authorization override flag, global finance customer ID, local customer ID, demand transaction indicator, message format, message priority, enterprise global finance parent ID, originator batch ID, originator ID, originator reference number, originator's time, possible duplicate flag, processing location, reference number, time stamp, remote authorization flag, requesting originator reference, and securities number.

The business messages used by the delivery system of the present invention include, but are not limited to, the currently available S.W.I.F.T. message types shown in Tables 1–3 for Cash Management, Securities, and Trade services, respectively.

TABLE 1

Cash Management Business Messages

| S.W.I.F.T. MESSAGE TYPE | DESCRIPTION |
|---|---|
| MT100 | Customer Transfer/Check |
| MT110 | Advice of Check/Void |
| MT111 | Request for Stop Payment |
| MT192 | Cancellation of MT100, MT110, or MT111 |
| MT202 | General Fin'l Institution Transfer/Check |
| MT210 | Advice to Receive |
| MT292 | Cancellation of MT202 or MT210 |
| MT940 | Account Statement with Detail |
| MT942 | Interim Transaction Report (Debit/Cred.) |
| MT950 | Account Statement |
| MT199/MT299 | Free Format Message |

TABLE 2

Securities Business Messages

| S.W.I.F.T. MESSAGE TYPE | DESCRIPTION |
|---|---|
| MT520 | Receive Free |
| MT521 | Receive Pay |
| MT522 | Deliver Free |
| MT52A | Affirmation |
| MT523 | Deliver Pay |
| MT530 | Confirmation of Receipt Free |
| MT531 | Confirmation of Receipt Against Payment |
| MT532 | Confirmation of Delivery Free |
| MT533 | Confirmation of Delivery Against Payment |
| MT554 | Advice of Money Income |
| MT571 | Statement of Holdings |
| MT572 | Statement of Transactions |
| MT573 | Statement of Pending Transactions |
| MT592 | Cancellation Message |
| MT595 | Queries |
| MT596 | Answers |
| MT940P | U.S. Cash Projection Statement |
| MT599 | Free Format Message |

TABLE 3

Trade Business Messages

| S.W.I.F.T. MESSAGE TYPE | DESCRIPTION |
| --- | --- |
| MT77A | Letter of Credit Balance Statement |
| MT77B | Letter of Credit Presentation Activity Statement |
| MT77C | Letter of Credit Funding Statement |
| MT77D | Letter of Credit Charges Statement |
| MT77E | Shipment Details |
| MT77F | Collection Statement |
| MT77G | Amendment Activity Statement |
| MT77H | Bills Presentation Activity |
| MT70B | Generate Letter of Credit Applications |
| MT70Z | Extension of MT70B |
| MT73I | Letter of Credit Issuance Advice |
| MT73P | |

It should be noted that some of the above message types may only be available in certain geographic regions around the world, as determined by local banking practices and/or the particular bank branch involved.

TI, PI and Event Message Flows

The purpose of the message flow is to satisfy a customer requirement to communicate with the OLTPs, both to send transaction instructions from the CFs 12(1,2, . . . i) to the OLTPs 14(1,2, . . . n), and product inquiries from the CFs to the GID 10 and OLTPs, as well as to receive status and event information back from the OLTPs. For purposes of explaining the general operation of the system, three generic classes of messages will be described. Messages in the first class of messages are referred to as transaction instruction messages (TIs). TI messages can be thought of as customer-initiated instructions to the OLTPs 14(1,2, . . . n) to act on behalf of the customer.

Messages in the second class of messages are referred to as inquiry messages. Inquiry messages can be in the form of GID inquiry messages (GIs) directed to the GID 10, or product inquiry messages (PIs) directed to the OLTPs 14(1, 2, . . . n). These messages can be thought of as requests for information from the system by the customer.

The third class of messages consists of those referred to as status or event messages. These messages are created by the OLTPs 14(1,2, . . . n) upon receiving TI messages, transferring or receiving funds, or making other transactions ordered by or affecting the customer. Event messages are used to inform the customer of any activity which they are entitled to receive, such as activity occurring in the customer's accounts.

Status messages are used to inform the customer of the progress of TI messages through the delivery system. Status messages provide information such as whether the TIs have been processed or are currently being processed by the financial institution, and whether the TIs are in progress, accepted, or rejected by the OLTP or the bank branch or other financial institution associated with the OLTP.

The message flow between the customer facility 12, the GID 10, and the OLTPs 14(1,2, . . . n) will now be described for the most common message flows with reference to the flow charts of FIGS. 5 to 7.

Figure 5A:
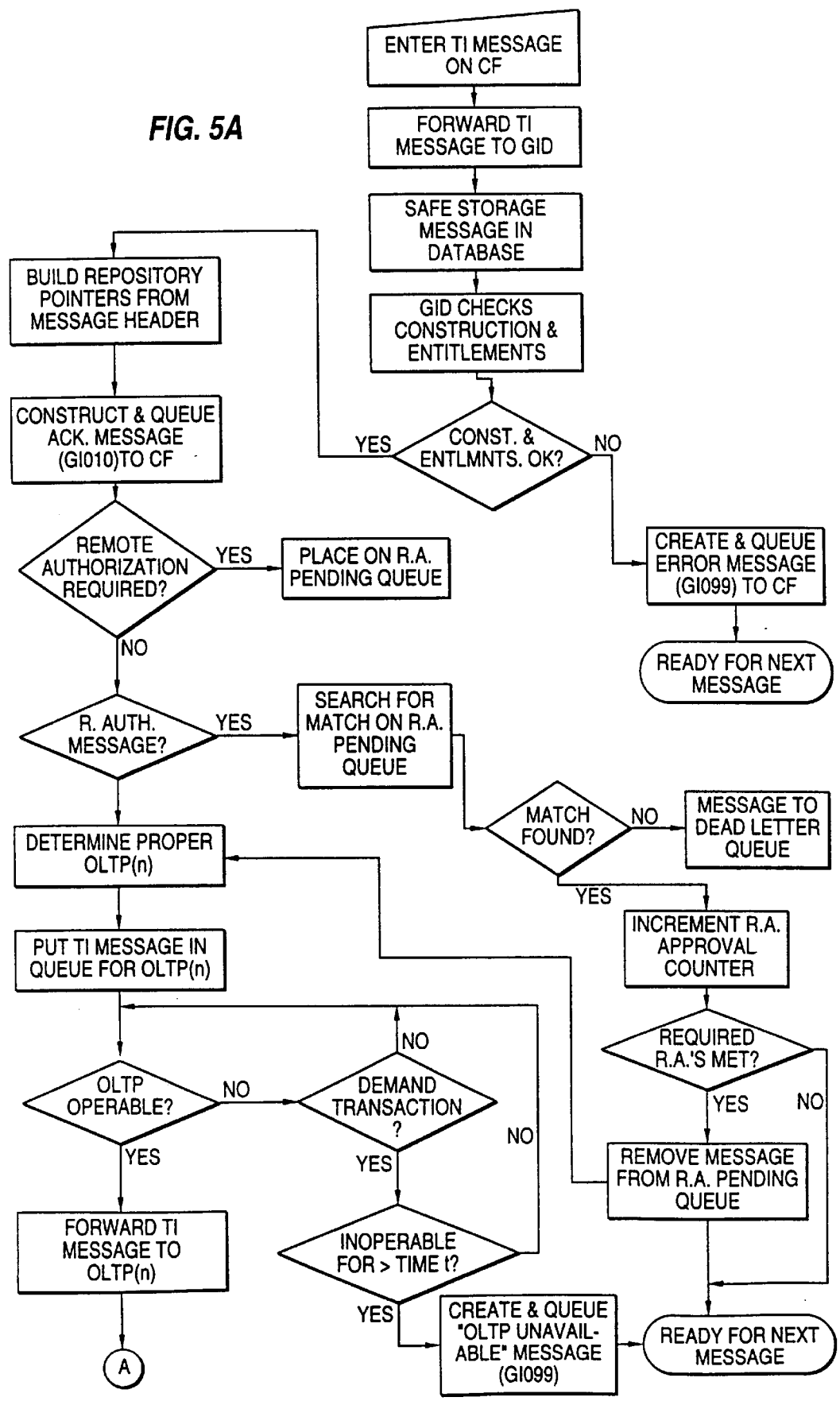
FIGS. 5A and 5B are flow charts of a transaction instruction message from a customer to an on-line processing system using the present invention.
Figure 5B:
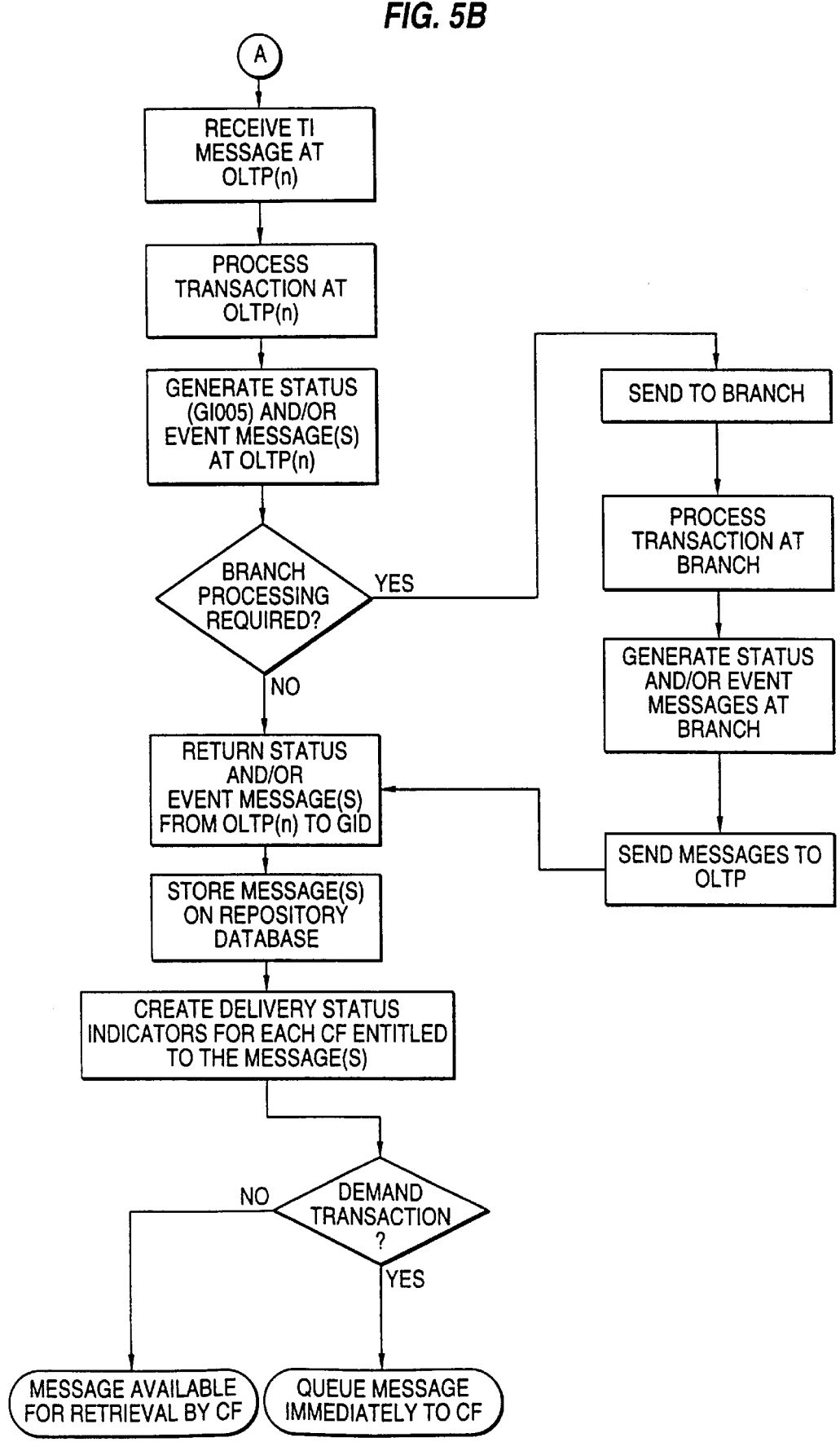

Referring to FIGS. 5A and 5B, a message flow for a transaction instruction (TI) (an instruction from a customer to an OLTP) is shown. Before sending a TI through the system, the customer must perform the log-on sequence shown in FIG. 3 to gain access as an authorized user of the system. After gaining access, the customer can then enter a TI message and forward the message from the CF to the GID 10. The GID 10 receives the message and safe-stores the message in the repository 11. The GID 10 then validates the construction of the message and checks the user's entitlements to insure that the message is in the proper format and that the user is entitled to the type of transaction requested for the particular account.

If the TI does not require remote authorization, the TI is then queued to the appropriate OLTP 14(1,2, . . . n). The OLTP processes the transaction as instructed, and sends one or more "status" or "event" messages back to the GID 10. Those messages again go through construction validations and entitlements in the GID 10 and are safe-stored in the repository database 11. If the TI is a demand transaction instruction, the status and event messages from the OLTPs are queued immediately to the CF 12. Otherwise, the status and event messages remain available for later retrieval by the CFs from the GID 10.

A message relating to a demand transaction is indicated in the TI message sent by the CFs 12(1,2, . . . i) and also in the status messages sent back by the OLTPs 14(1,2, . . . n). The customer does not need to send a separate request to the GID to receive the status messages for demand TIs since these messages are queued to the CFs automatically.

It is important in a business context to provide instant feedback following certain types of transactions, such as demand transactions. For example, a customer that makes a high priority funds transfer will typically want to stay connected to the system waiting for confirmation that the transaction has occurred. The customer often needs to know immediately (i.e., in real time) that the transaction has been accepted and acted upon. The delivery system of the present invention ensures immediate feedback of messages relating to demand TIs.

As shown in FIG. 5A, if the TI requires remote authorization, the TI message is placed on a remote authorization pending queue in the remote authorization subsystem 19 of the GID 10. If the TI is an authorizing message, the subsystem 19 will match the authorizing message with an earlier queued TI. The TI message is forwarded to the appropriate OLTP 14(1,2, . . . n) only after the required number (e.g., 0 to 9) of remote authorizations are received by the GID 10.

Figure 6:
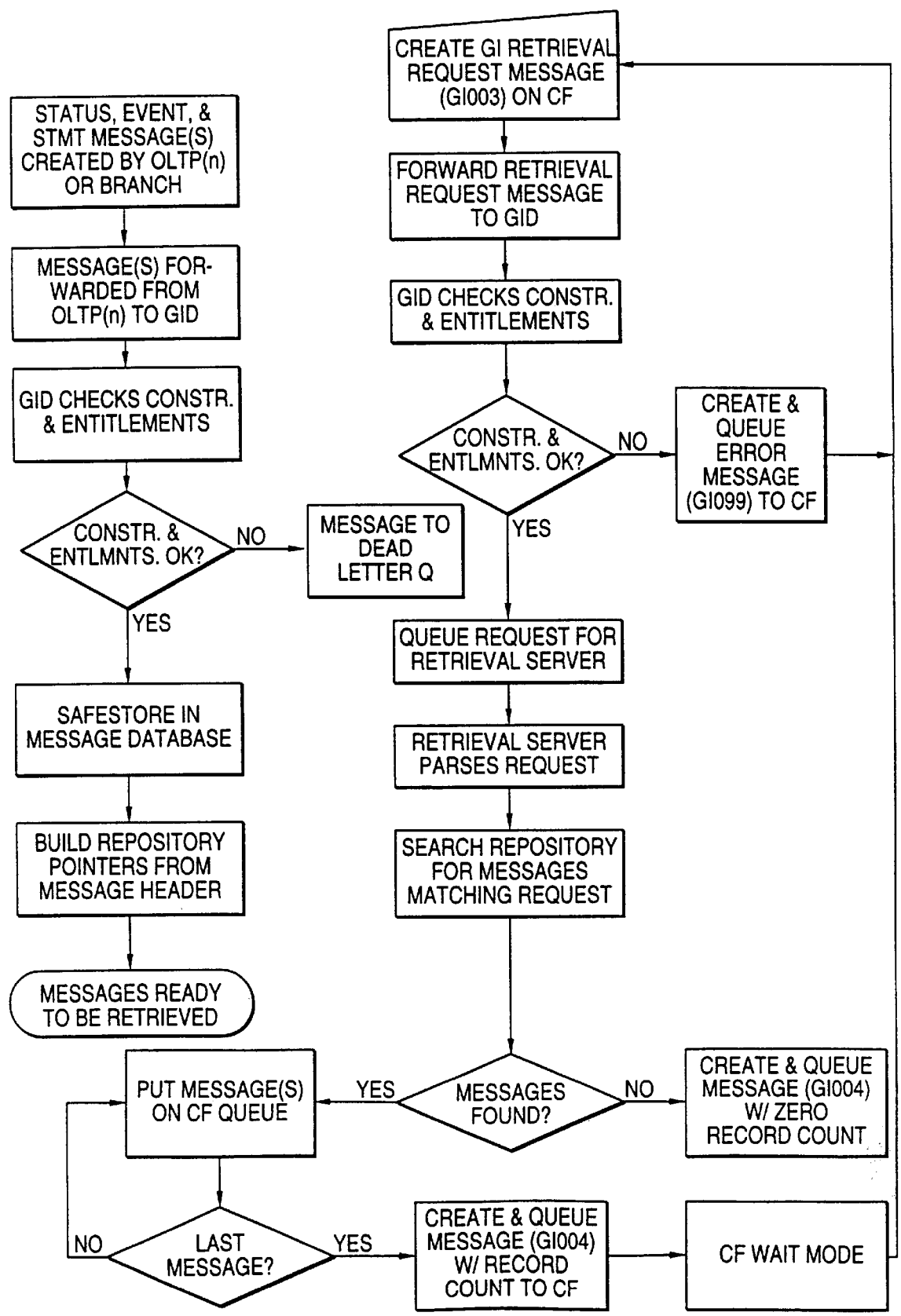
FIG. 6 is a flow chart of a process for retrieving messages from the global interface device of the present invention.

Referring to FIG. 6, a message flow for status and event data is shown. Status and event messages are periodically created by the OLTPs 14(1,2, . . . n) and sent to the GID 10. These messages contain information such as the status of a TI, the receipt or transfer of funds in a customer's account, and so forth. When the status and event messages are received by the GID 10, the entitlement subsystem 16 checks the construction and entitlements of the messages and then stores the messages in the message database of the repository 11.

The status and event messages from the OLTPs (other than those relating to demand TIs) sit in the repository 11 of the GID 10 until the customer sends a message retrieval (GI) request from the CF to the GID. The message retrieval request goes through construction validation and entitlement checks in the subsystem 16 of the GID, in a manner similar to that used for TI messages. The message retrieval request also gets processed by the GID 10 which queries the repository 11 looking for any messages that meet the criteria of the request. The system then queues the messages that meet the criteria to the CF 12(1,2, . . . i).

In this manner, the present system provides timely access to financial services throughout the world in essentially a real time system. Transactions or activities occur in customers' accounts around the world in bank branches where the customer transacts business. When a transaction or other activity occurs, a message is created based on that event and sent through the delivery system of the present invention to the appropriate customer facility 12(1,2, . . . i).

For example, a customer that has a cash account at a bank branch in Singapore can receive funds into his account from a third party anywhere in the world. The software at the branch in Singapore will recognize the receipt of funds and create an event message to inform the customer that the receipt of funds event occurred. The event message is then sent through the GID 10 of the present invention and stored in the repository 11. The customer can then retrieve the event message by sending a retrieval request (GI) from the customer's CF 12(1,2, . . . i) to the GID 10.

Figure 7:
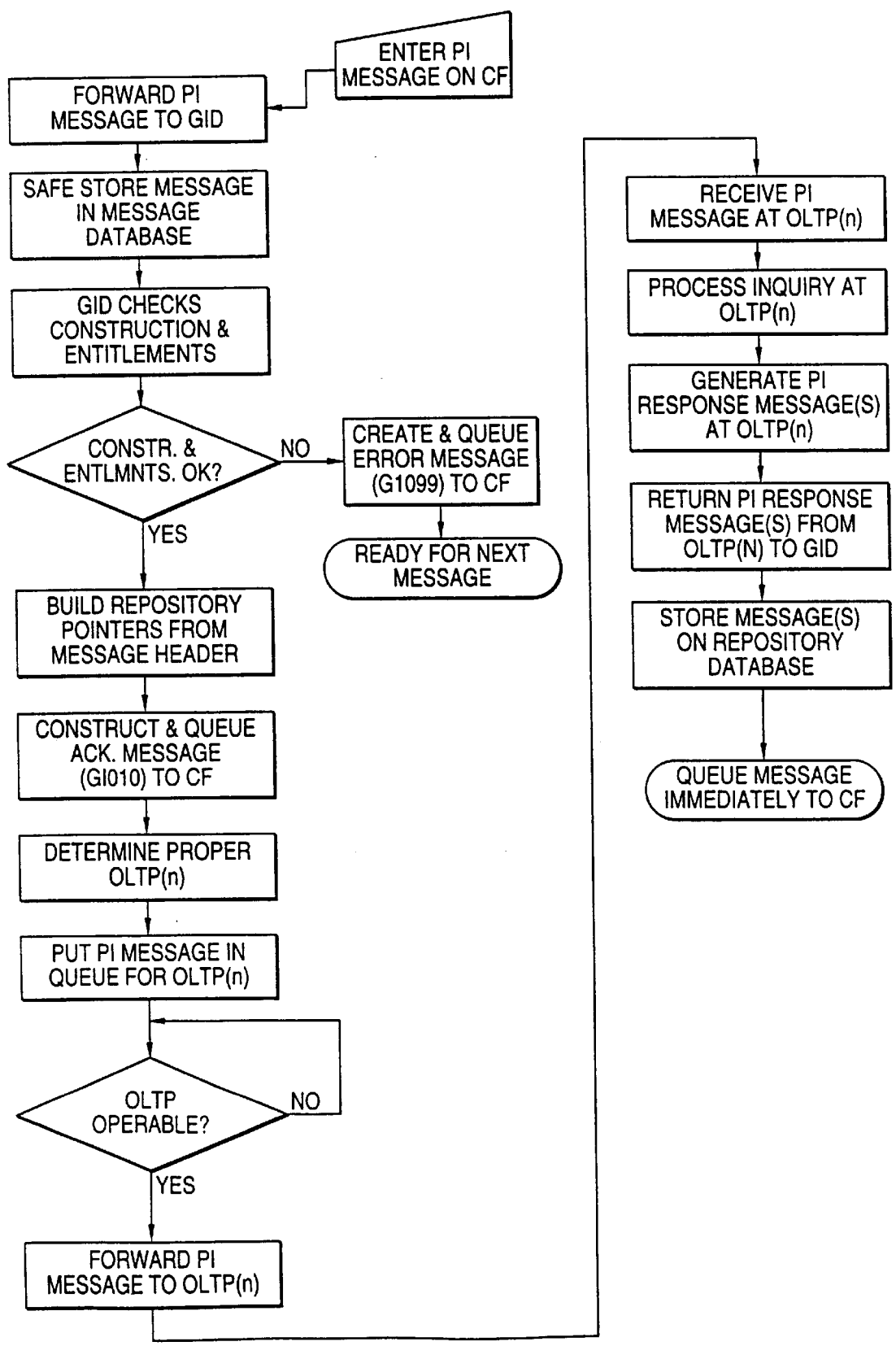
FIG. 7 is a flow chart of a product inquiry demand from the customer to an on-line processing system through the delivery system of the present invention.

FIG. 7 shows the flow of a demand inquiry (PI) message sent from the CFs 12(1,2, . . . i) to the OLTPs 14(1,2, . . . n) through the GID 10. When the PI messages are received by the GID 10, they are safe-stored in the message database of the repository 11 and checked for valid construction and entitlements in the subsystem 16. The PI message is then queued to the proper OLTP, for example, OLTP(n). When the OLTP(n) becomes operable, the message is forwarded to the OLTP(n), the inquiry is processed by the OLTP(n), and the selected messages are returned from the OLTP(n) to the GID 10. The returned messages are stored on the repository database 11 and immediately queued to the appropriate CF 12.

Communications Software

A primary goal of the present invention is to permit the exchange of machine-readable information between the GID 10, the OLTPs 14 and the CFs 12. As described above, the machine-readable information is transmitted in the form of a two-part message structure (i.e., a header portion, and a main business or service message portion). Two different communications software packages have been developed to allow the different types of CFs 12 to communicate with the GID 10. The first package, used to connect the PC-based CFs 12(1–4) to the GID 10, will be referred to as a PC transport. The second package, used to connect the mainframe CF 12(5) to the GID 10, will be referred to as a CPU-CPU protocol engine. Both communications packages may, for example, be based on "GPMIP", LOGICA Corp.'s proprietary application level protocol. The two communications packages are described in further detail as follows:

PC Transport

The PC transport has been developed to allow customers to connect their PC-based workstations 12(1–4) to the GID 10. Data exchanged between the PC transport and the business applications software in the CFs 12(1–4) can be done, for example, via standard operating system files (e.g., files supported by the operating system sold under the trademark "MS-DOS") on the PC. Two directories of files are used for the messages. The INBOUND directory contains messages received from the GID 10. The OUTBOUND directory holds messages to be sent to the GID 10. Messages to be sent to the GID 10 are each created as a separate file in the OUTBOUND directory with an extension of SND.

Until they are ready for transmission, files in the OUTBOUND directory must have a temporary extension, such as TMP. When ready for transmission, the file extensions are renamed to SND. This technique prevents the PC transport software from reading a partially-written file.

Incoming messages are read from the INBOUND directory. The files have an extension of IN and contain a unique sequential number. The business application software will rename the file's extension to PRO when the message has been processed so that the processed files can be easily identified and deleted.

Figure 8:
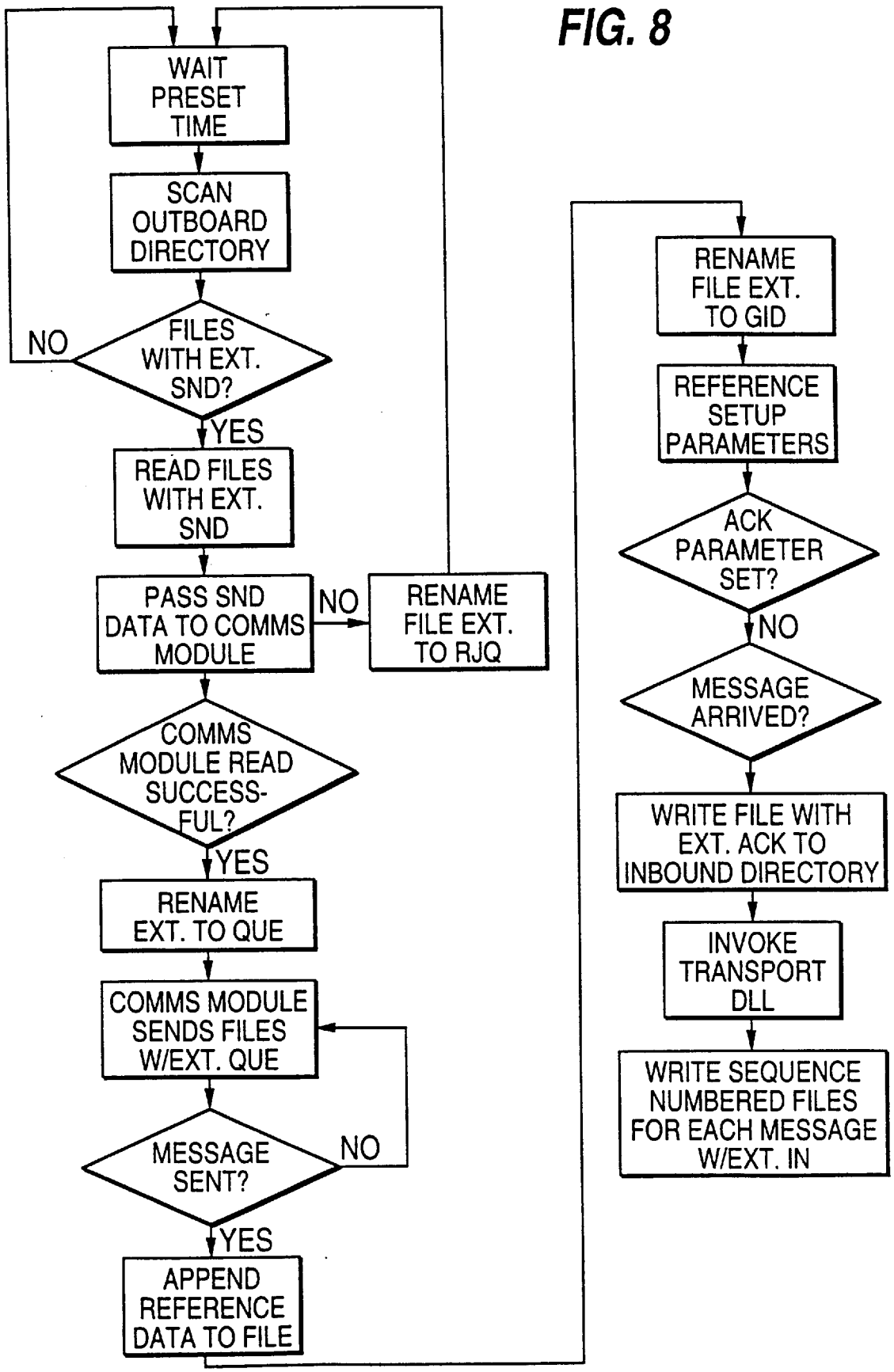
FIG. 8 is a flow chart of a send and receive process provided by the communications software (PC-Transport) of the present invention for PC-based customer facilities.

A process of sending and receiving messages with the PC transport program is shown in FIG. 8. The transport program scans the OUTBOUND directory at predetermined time intervals (e.g., 40 seconds), reading files with an extension of SND. SND data is then passed to the COMMs module and, when successfully read, the SND file extension is renamed to QUE. If the COMMs module fails to queue the message (because the message contains invalid data), the SND file extension is renamed to RJQ. When the message has been sent by the COMMs module, an identifying reference and time stamp is appended to the file and the file extension is renamed to GID. When specified in the setup procedure, a file with the extension of ACK will be written to the INBOUND directory containing the acknowledgment message. Message priority is initially based on the time stamp of the SND file, but the COMMs module can be reordered based on message priority.

The COMMs module invokes the transport program DLL file when a message arrives. The transport program DLL file writes sequentially-numbered files for each message. Each file has an extension of IN for retrieval. The transport program has a screen interface allowing INBOUND and OUTBOUND directories to be configured and to display information about the link.

Figure 9:
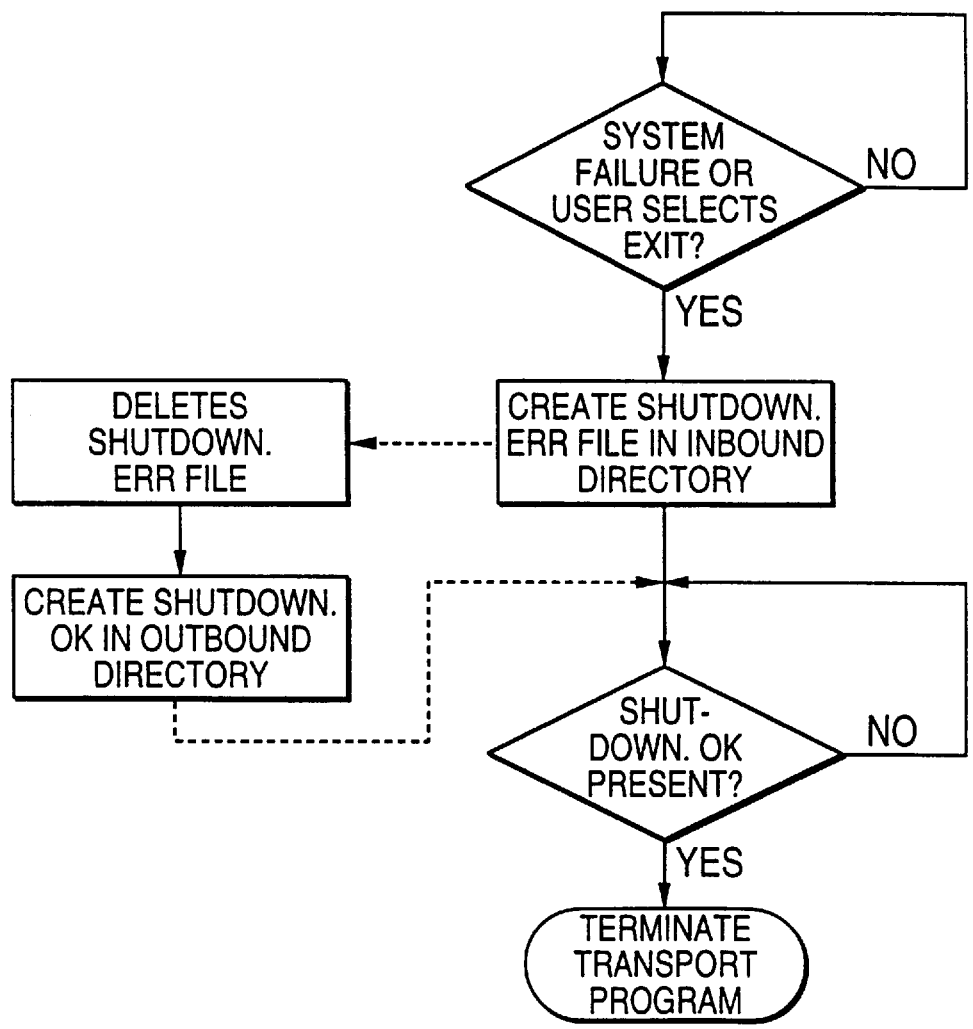
FIG. 9 is a flow chart of a shutdown process for the PC-Transport of the present invention.

FIG. 9 illustrates the flow of the shutdown process used by the PC transport. As shown in FIG. 9, upon a system failure or the operator selecting Exit from the menu of the business application, the system will begin shutting down. At this time, a SHUTDOWN.ERR file is created in the INBOUND directory and the business application will close as soon as possible without losing any file integrity. After deleting the SHUTDOWN.ERR in the INBOUND directory, a file SHUTDOWN.OK will be created in the OUTBOUND directory by the business application software before it exits. The PC transport program terminates only after the SHUTDOWN.OK file is detected. The operator can then exit the business application and switch off the machine.

FIG. 10 shows the process used by the PC transport program for handling errors. The PC transport counts the number of files in the OUTBOUND directory at predetermined intervals (e.g., 5 minutes). If the overall number of SND files does not decrease by the next count, this will be treated as an error condition and an operator should investigate. If a message is rejected by the COMMs module as invalid, the extension will be changed to RJQ. There is a configuration option that permits RJQ files to be copied into a user-specified directory.

If the link goes down, a file called NOLINK.ERR will be created in the INBOUND directory. If the COMMs module queue becomes full, a file QUEFULL.ERR will be created in the INBOUND directory. Both of these files will be deleted by the PC transport program when the error condition is rectified.

A SYSTEM.LOG file is created in the INBOUND directory and appended to when a non-fatal error occurs. For example, this LOG file is used when there is a failure to queue a SND file and a re-try is attempted. A SYSTEM.ERR file is created when a PC system failure occurs during the PC transport program processing with the contents of the file containing the reason for the failure. The business application can then be shut down as soon as possible and an operator summoned. When the system is restarted, the PC transport program will delete the SYSTEM.ERR file after displaying the information to the operator. If the link is on, the PC transport program will check that the files with an extension of IN are being processed. If they are not, the system will notify the operator by flashing a message and/or beeping.

CPU-CPU Protocol Engine

The CPU-CPU protocol engine has been developed to allow the customer's mainframe CF 12(5) to communicate with the GID 10. The customer's applications software (described below) within the customer's mainframe CF 12(5) uses the communications software via application programming interfaces (APIs) to send messages to and receive messages from the GID 10.

The communications software provides a message protocol for the electronic delivery system of the present invention.

The message protocol can be, for example, provided over a System Network Architecture logical unit 6.2 protocol (e.g., SNA/LU6.2) (and optionally with qualified link level control ("QLLC")) using customer information control system ("CICS") transactions and modules. The CICS transactions and modules preferably rely upon CICS and operating system software provided by IBM for data communications and database management using operating system components available under the tradenames VTAM, VSAM, DFP and MVS. The CICS also uses network control programs (e.g., programs available under the tradenames IBM NCP, and NPSI if QLLC is selected) implemented in its communications controller to access the GTN 13. Each of these operating systems and the network control programs must be configured to support the communications software by either table entries or system generation options.

The protocol engine includes the following major components: stream manager, control and configuration manager, conversational receive, receive, send, CF prototype, queue manager, script generator, response processor, exits, control file, file I/O, error logging, sequence number synchronization, LU6.2 session monitor, message log, trace and log print utility, password cipher, and automated password manager. The flow processes supported by these components are shown in FIGS. 11–13.

Figure 11:
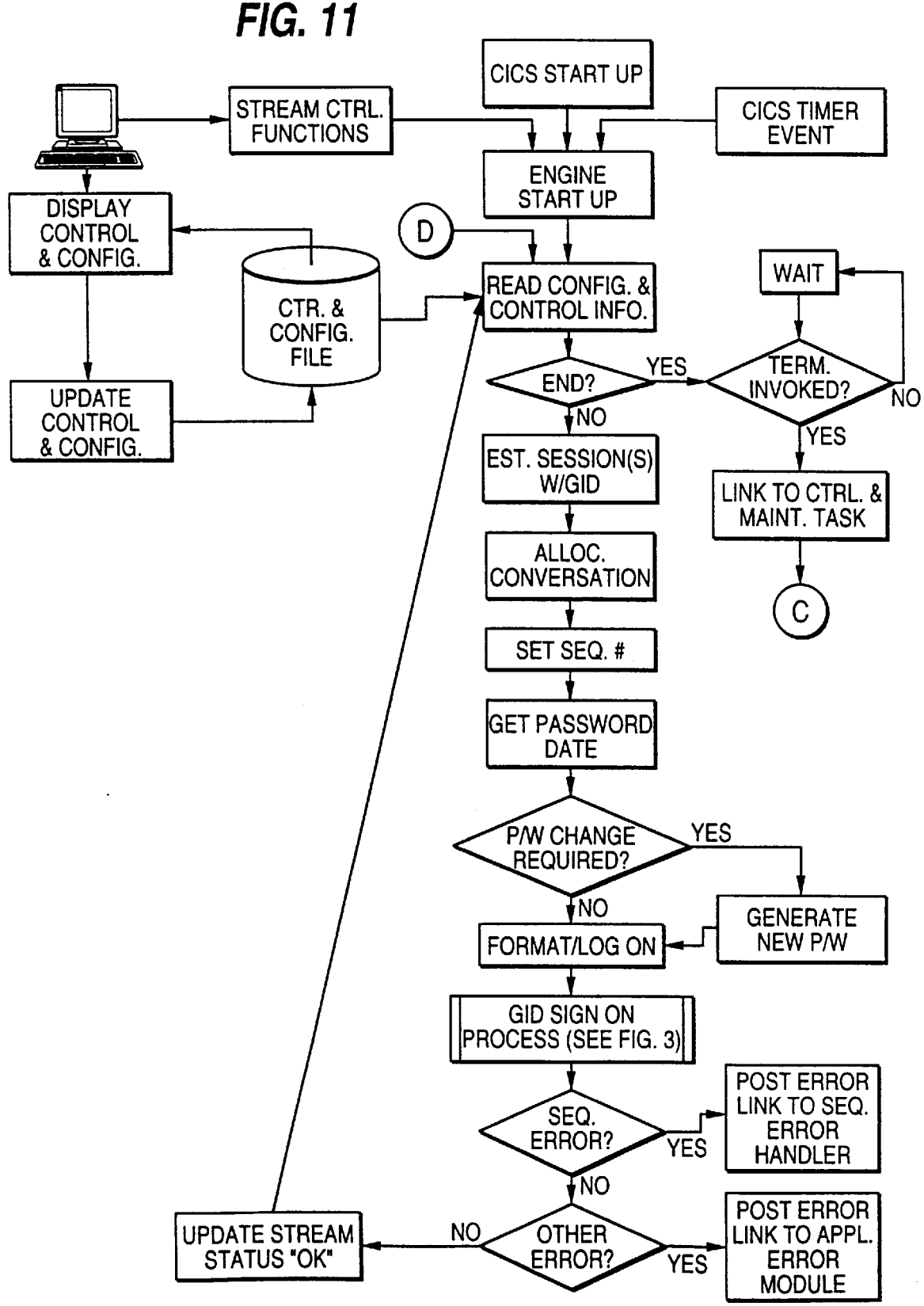
FIG. 11 is a flow chart of a configuration and control maintenance and stream manager process used for the communications software (CPU-CPU protocol engine) of the present invention for mainframe customer facilities.

FIG. 11 shows the flow process of the stream manager component and the configuration and control maintenance component of the protocol engine. The stream manager and LU6.2 monitor tasks can be initiated directly from a CICS terminal or by a CICS START command invoked by the application in one of three ways: at CICS startup time as part of processing load table processing; by a CICS timer task from an application administrative sub-system; or from a card reader line printer facility.

In addition, it may be necessary to restart the stream manager as a result of a line or GID outage. If the communications software (probably during the send task) detects a stream failure, it will link directly to the stream manager for restarting the streams. The LU6.2 session monitor task will also update the current stream status after an SNA session outage.

The configuration and control maintenance component is responsible for displaying the information contained in the control and configuration files and modifying the contents of the files. The maintenance component is used during the initial installation of the communications software in a new CICS application region. The user ID, password, stream IDs, etc., are configured using the maintenance component. During normal executions, the maintenance component can be invoked to track use of the communications software and monitor the state of individual streams. The maintenance utility can also be used to manually invoke the stream manager to start/stop individual streams.

Referring to FIG. 11, the configuration and control maintenance component of the protocol engine software is shown as a terminal-based facility that displays the contents of the control and configuration files, and provides a vehicle for updating the various control and configuration parameters. The maintenance terminal also provides a stream control function. The stream control function is one of three ways the engine software can be invoked or started at the OLTP or customer CPU (mainframe).

A second way of invoking or starting the engine software is the CICS start up whereby the CICS can be configured to automatically bring up the protocol engine software when the CICS system is started. A third way of invoking the engine software is the CICS timer event whereby the CICS can be configured, for example, to start the protocol engine software at a predetermined time of the day.

When the protocol engine software starts, it reads the configuration and control file and determines if the file is at its end. If the file is not at its end, the protocol engine software begins to process each of the entries that it finds in the configuration file. The protocol engine establishes a session with the GID 10 for each of the stream records found in the configuration file. After a logical (LU) session is established, the protocol engine allocates the conversation with the GID and determines the starting sequence number from the configuration file.

The protocol engine also checks the password in the configuration file for each stream in which a session is established. The protocol engine determines whether or not the password needs to be changed based on the current date and time. If the password does not need to be changed, the engine obtains the password from the control file for purposes of formatting the log-on message for communicating with the GID 10. If the password does need to be changed, the engine generates a new password and substitutes the newly generated password in the log-on message. After the log-on message is formatted, the log-on sequence with the GID 10 continues, as shown in FIG. 3.

During the log-on sequence with the GID 10, the protocol engine checks for two general types of errors based on information received back from the GID. The first is a sequence error check. If a sequence error is detected, the engine software will post the error condition in the CICS COM area and then link to the sequence error handling module where the error can be handled in a predetermined manner (e.g., stop the communication and notify the customer assistance center if the sequence number discrepancy cannot be programmatically resolved).

If no sequence error is detected, the protocol engine next checks for other types of errors. For all other types of errors, the error is posted in the CICS COM area, and the engine then links to an application error module that handles the conditions as the user decides. If no errors are encountered during the log-on sequence, the control information on the configuration control file is updated to indicate that the log-on was successful, and the process returns to the reading of the configuration file to process the next stream record. The process continues until all of the stream configuration records have been read and the log-on sequences have been completed for each of the records.

At the end of the configuration file, a determination is made as to the mode of engine startup. If the protocol engine was started from the terminal-based facility, then the software links back to the control and maintenance task. If the protocol engine was invoked by a CICS-initiated event, then the stream manager goes passive, and the software monitors the status of the links and makes that information available for viewing on the control and maintenance display.

The receive module of the communications software is responsible for all CICS LU6.2 related activities, for following the protocol, for decoding/encoding the application level protocol and, as necessary, the routing headers added by the GID 10. Once the receive task is initiated, inbound messages will continue to be processed until the GID decides to terminate the LU6.2 conversation or until the communications software or the application responds with a NAK message. To force a write of the VSAM control file, a CICS Syncpoint is issued upon completion of each received message.

The receive module of the protocol engine software supports normal receive processing, as well as a conversational receive function. The communications software distinguishes between conversational and normal receive processing by a stream type field in the stream configuration record. In both cases, the GID 10 allocates the receive task.

The normal receive function handles the LU6.2 and application level protocol details of receiving a message from the GID 10. The normal receive function also allocates storage for the message being received and frees the storage when the message is no longer needed.

Once the message has been received, the receive module performs a CICS link to the user application module. The application module invoked is specified in the configuration record for the receive stream which can be set up using the maintenance function.

In conversational receive processing, the application sends a message to the GID in response to a message received from the GID. The receive module allocates the storage needed for the message being sent and frees the storage when it is no longer needed.

Figure 12A:
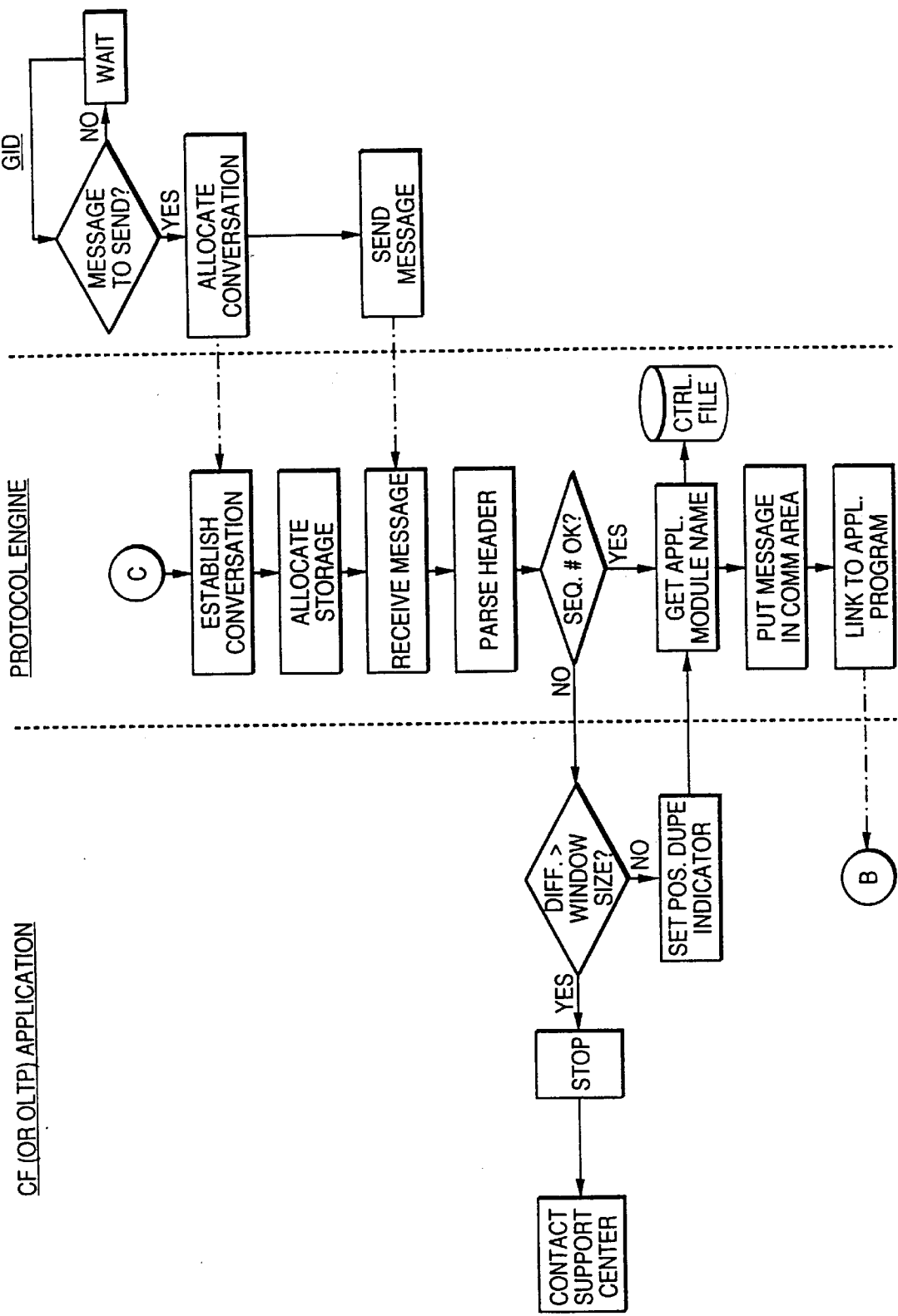
FIGS. 12A and 12B are flow charts of a normal and conversational receive process for the CPU-CPU protocol engine of the present invention.
Figure 12B:
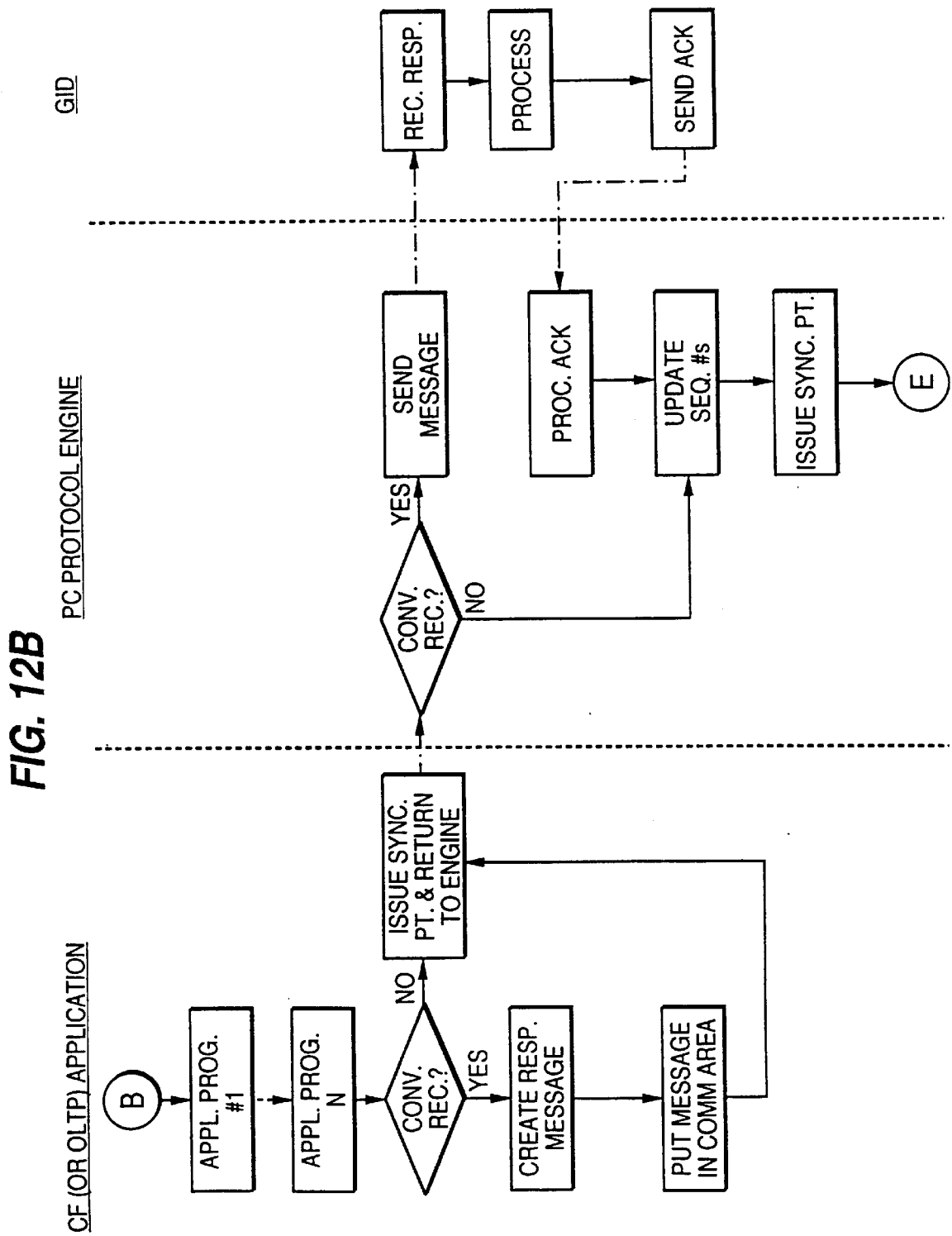
Figure 13:
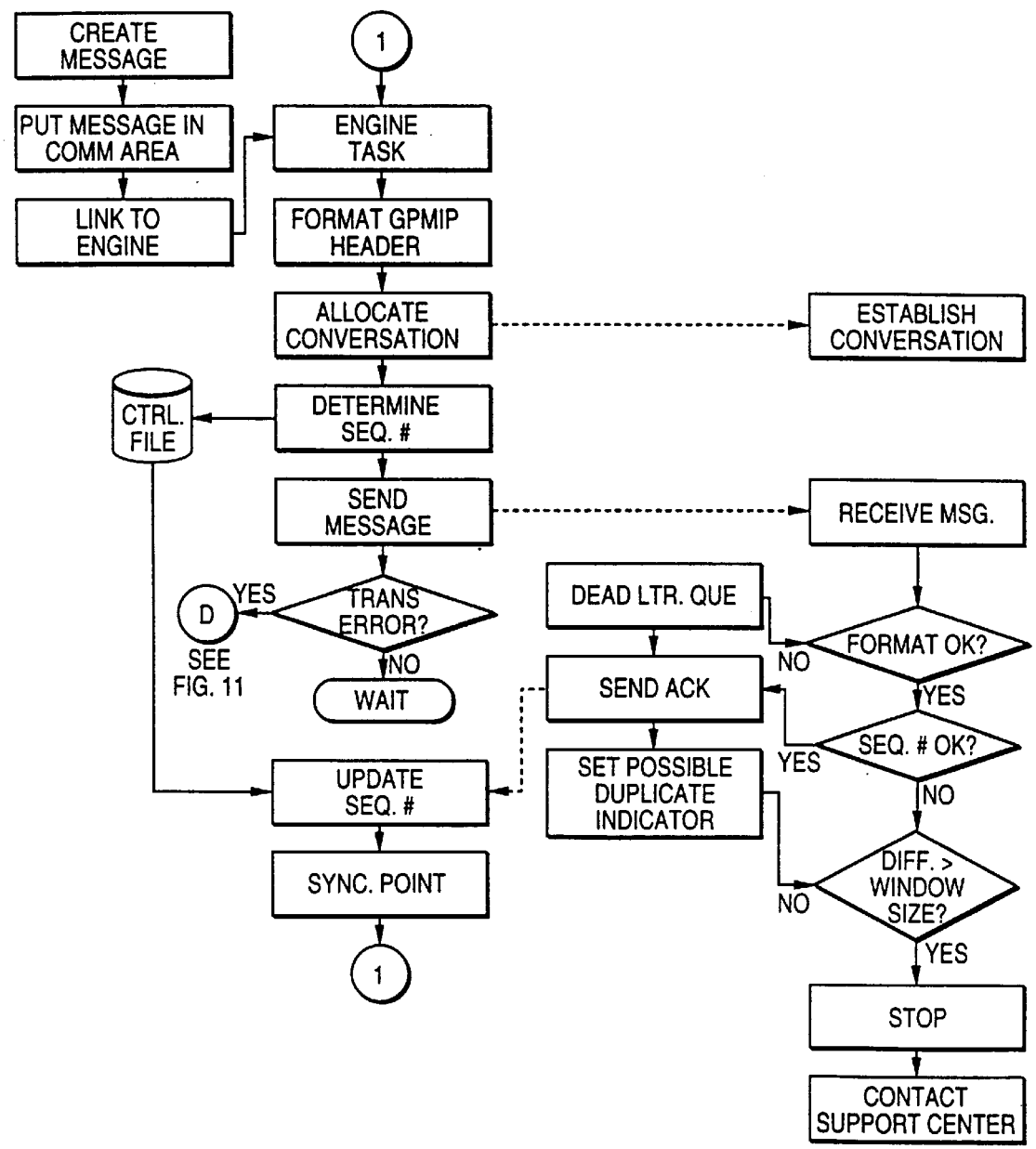
FIG. 13 is a flow chart of a send process for the CPU-CPU protocol engine of the present invention.

FIGS. 12A and 12B show the flow of a normal and a conversational receive process provided by the protocol engine. For purposes of illustration, the normal and conversation receive process shown in FIGS. 12A and 12B is shown under the headings "CF (or OLTP) Application", "Protocol Engine", and "GID," to illustrate that the protocol engine is a piece of software that functions as an intermediary between the GID 10 and the CF 12 (or OLTP 14) applications.

The normal and conversational receive process begins with the GID 10 determining whether it has a message to send to a CF 12 (or OLTP 14). If no message exists, the GID 10 goes into a wait state for a predetermined period before again checking for messages to send. If the GID does have a message to send, then the GID sends an allocation message to the protocol engine to establish a conversation with the CF 12 (or OLTP 14). On receipt, the protocol engine establishes the conversation, assigns or allocates some internal storage for the message it is about to receive, and then receives the message sent from the GID.

Having received the message, the protocol engine then parses the header of the message and begins processing the message. The first step in processing the message is to check the sequence number of the message. If the sequence number supplied by the GID 10 does not match the sequence number expected by the protocol engine, the engine determines whether the difference in the sequence numbers is greater than a preset window size (e.g., one). If the difference is greater than the window size, the process stops and the engine requires manual intervention and a call to the customer support center to diagnose what caused the difference in sequence numbers during the previous conversation. If the sequence number difference is within the window size, a recovery process ensues, and each message is set with a possible duplicate indicator.

If the sequence number is OK or within the preset window size, the engine will continue the receive process by getting the name of an application program from the control file that it will link to. After getting the name of the application program, the protocol engine puts the message into a CICS COMM AREA and transfers control to the application program. Then one or more application programs will process the received message as necessary for the customer or OLTP environment.

After the application program(s) process(es) the message, and if the normal receive mode has been requested, then the application issues a synchronization point and simply returns to the engine.

If the conversational receive mode is requested (meaning that the application software wants to send a message back to the GID), a response message is created, put into the COMM AREA, a synchronization point is issued, and control is returned to the engine. The engine then sends the response message to the GID. When the GID receives and processes the response message, the GID sends an acknowledgment back to the engine. The engine processes the acknowledgment, updates the sequence numbers, and issues a synchronization point.

The send module of the communications software sends messages to the GID on behalf of the invoking application. The send module executes under the application task and handles all CICS LU6.2 related activities, following the communications protocol of the delivery system, and for decoding/encoding the communications headers.

Once the send task is initiated, outbound messages will continue to be processed until the application decides to terminate the LU6.2 conversation. To force a write of the VSAM control file, a CICS Syncpoint is issued upon completion of each message sent.

FIG. 13 shows the flow of a send process provided by the protocol engine. The send process is used for sending a message from the CF 12 (or OLTP 14) applications to the GID 10. As with FIG. 12, the send process shown in FIG. 13 is shown under the headings "CF (or OLTP) Application", "Protocol Engine", and "GID" to illustrate that the protocol engine is a piece of software that functions as an intermediary between the GID 10 and the CF 12 (or OLTP 14) applications.

The send process begins with the CF (or OLTP) application program creating a message that it wants to send, putting the message into the CICS COMM AREA, and linking to the protocol engine. After linking the application program to the protocol engine, the engine wakes up and formats an applications level protocol header for the message. The engine then allocates a conversation with the GID and the GID responds by establishing a conversation. The engine then determines the proper sequence number for the message by looking at the control file to get the last sequence number. The engine then sends the message with its appropriate sequence number to the GID.

Upon receiving the message, the GID performs some basic checks on the message, including a message format check and a sequence number check. If the message format is not acceptable, the message is either: (a) for the CFs, rejected with an error message (GI099) with error code; or (b) the message is placed on the dead letter Q in the GID (the OLTP operational mode) and a protocol acknowledgment is sent back to the engine. If the message format is acceptable, the GID then checks the sequence number to determine whether the sequence number corresponds to that expected by the GID (i.e., not a duplicate or a skip).

If the sequence number is OK, the GID sends an acknowledgment back to the engine. If the sequence number is not OK, the GID determines whether the difference between the received sequence number and the expected sequence number is greater than a preset window size (e.g., one). If the difference is not greater than the preset window size, the GID sets a "POSDUPE" (possible duplicate) indicator and sends an acknowledgment back to the engine. If the difference in sequence numbers is greater than the window size, the process stops and the customer support center must be contacted to manually intervene in the process.

After acknowledging the message, the protocol engine updates its sequence number count on the control file, sets a synchronization point, and waits for another message.

The LU6.2 Session Monitor component of the communications software is a set of functions that, when invoked, compare the status of each stream (enabled, inactive, disabled) with the current status of the SNA session (acquired, released). If the stream is 'Send' or 'Cust Fac Send' with a stream status of enabled and the SNA session is not acquired, the monitor automatically updates the stream status to 'I' (inactive). Subsequent application Send requests will reacquire the session via the Stream Manager.

If the stream is 'Receive', 'TWA', or 'Cust Fac Recv' and the monitor determines that the stream should be enabled (E) and its SNA session is not acquired, the monitor will then attempt to reacquire the SNA session and log on to the GID using the Stream Manager. If the log-on is unsuccessful, the stream's status is changed to "inactive" and an error message is displayed.

Although the communications software is primarily intended to be used by existing CICS application systems, a prototype application system is preferably included in the software package. The CF prototype exercises some features of the communications software and can act as a test generator for the delivery system. The CF prototype has a store-and-forward message queue facility.

A script generator utility within the CF prototype component generates test format messages and places them in the CF prototype message queue. The user can alter test scripts by inputting messages from a flat file or from fixed or variable length sources (created using an MVS/TSO editor).

The components of the protocol engine software require access to two classes of information to guide their operation: static information that describes the particular installation's use of the communications software, and dynamic information about the current status of the communication stream(s). These two classes of information are represented by separate record types: configuration records and control records.

All requests by the communications software for file information are handled by a file I/O module which makes the actual location of the data unimportant. The user may use an existing file or any other method to supply the information, as long as the file I/O module is properly customized. Once the information is retrieved, it is stored in a standard COMM AREA of the communications software and is available for the duration of the specific engine task.

The communications software automatically logs status and error information. The logging program invokes a user program exit if the configuration file indicates one. The maintenance function can be used to add the module to the configuration file. The communications log program will perform a CICS link to the application module passing the standard communications software COMM AREA. An API-ERROR-LOG portion of the COMM AREA contains information logged by the communications software.

A message log facility is provided to write application messages to a VSAM file. Each message is tagged as "send" or "receive" and recorded with a time stamp that is displayed when viewing the logged messages or when printing the messages off-line.

A trace and log facility uses control fields on a trace/log utility screen to collect information that allows the various "trace" and "status" files generated by the communications software to be sent as hard copy reports to a spool mechanism and routed according to user-defined job control language. In addition, the application message file can be routed to hard copy or viewed using an on-line viewing mechanism in conjunction with the spool mechanism.

Business Applications For The Customer Facilities

The electronic delivery system described above operates under a specially developed software package installed on the CFs 12. The software may operate on any standard, graphical interface, such as the program available from Microsoft Corp. under the trademark "WINDOWS." The software of the present invention can be used along with other software applications, such as word processing, spreadsheets, and graphics software, on the graphics interface (e.g., "WINDOWS"). A user can interact with the CF using a mouse or a keyboard for making selections, choosing commands, navigating between display windows, and entering data.

The software of the present invention provides a graphical user interface for a customer accessing a variety of dissimilar computerized financial services. The software also provides a first level of security for the electronic delivery system by requiring a user ID and password to be entered by the user before allowing access to any of the services or information on the system. A local system manager for the customer can control the entitlements (e.g., permissible transaction types, amounts, accessible accounts, etc.) for each individual user or workstation at the local level. This first level of security is in addition to the security provided by the GID 10 after communication with the GID is initiated.

Figure 14:
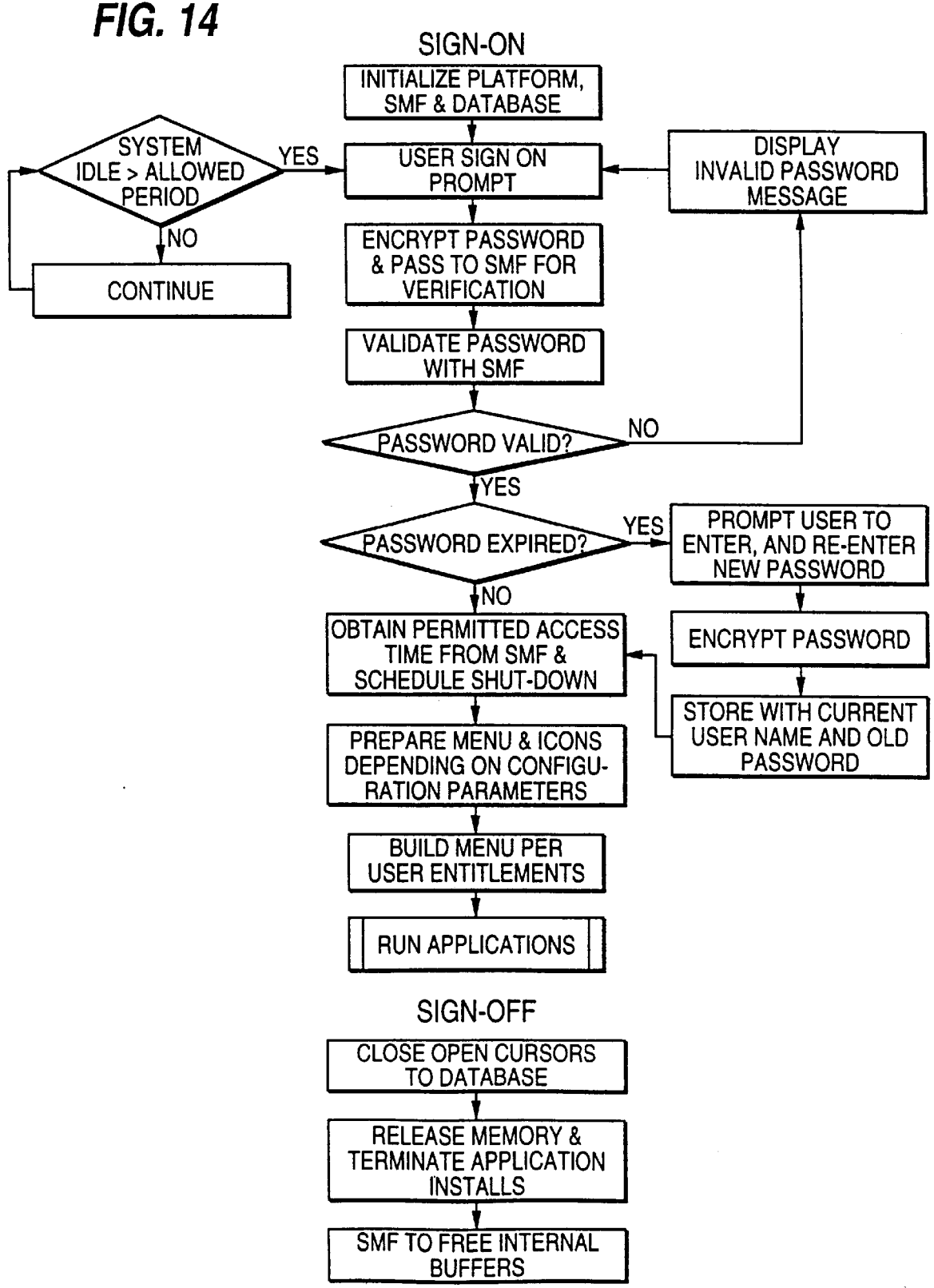
FIG. 14 is a flow chart of a local user sign on and sign off process for the present invention.

FIG. 14 is a schematic of the sign on process, the interfacing of the applications program with the security management function (SMF), and the sign off process.

After signing on to the workstation, a main window (shown in FIG. 15) appears with a number of icons and menus giving the user access to a variety of business and supporting applications related to the delivery system. Using menus or icons on the main window, the user can navigate between several business applications including: cash management, securities, trade, messages to the bank, investment portfolio, report viewer, report designer, communications manager, message retrieval, access control, day end, libraries, scheduler, and export manager. The user can enter data and instructions for each of these various activities directly into the workstation. The following is a brief description of each of these business applications.

Cash Management Application

Figure 15:
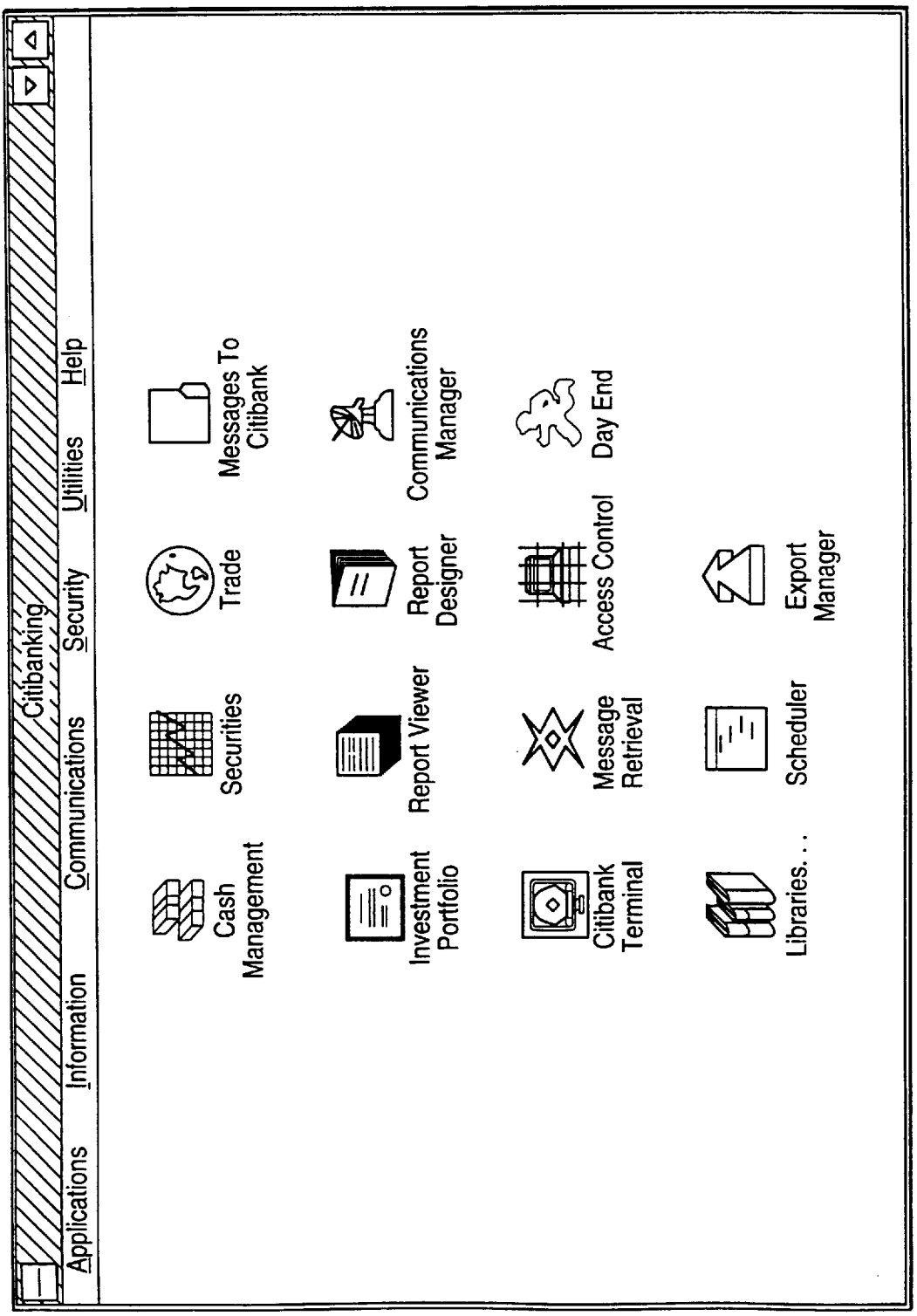
FIG. 15 is an illustration of a screen display showing a collection of business and supporting applications used with the present invention.

By selecting the Cash Management icon or menu item from the display screen shown in FIG. 15, a user can create, verify, authorize, modify, delete, and repair cash transactions, as shown in FIG. 16. The software supports all transaction types and allows a user to create a free format or preformatted transaction, perform a local transaction authorization, and interact with a variety of bank branches using a variety of different currencies.

Each user can perform only one of the create, verify, and authorize functions. A security manager can determine whether or when verification and authorization are required. Each transaction resides in the database and has a status that determines the next action required against it.

After selecting the Cash Management application, the application will present a window (see FIG. 17) to collect information about the transaction the user wants to create. Included in the window is a format selection box that allows the user to select between three different types of formatting for the transaction: free format, preformat, or group format. The free format feature allows the user to create a cash TI by entering data into all required and all appropriate optional fields. The preformat feature allows the user to create a cash TI using a partially or fully completed cash transaction template (e.g., all fields completed except the amount of the transaction). The group format is a collection of related preformats, such as payroll, accounts receivable, accounts payable, and treasury.

The cash management window shown in FIG. 17 also includes a transaction type list that allows the user to select the desired type of transaction. These transaction types can include Automated Clearing House ("ACH") credits and debits, Federal Reserve drawdowns ("Fed DrawDown"), customer transfers, bank transfers, Federal Reserve wire transfers ("FedWire transfers"), Clearing House Interbank Payment System ("CHIPS") transfers, book transfers, and so forth.

The transaction type can also be in the form of a pre-advice message that notifies a bank branch that the branch will soon receive funds (e.g., later that business day). The pre-advice feature is useful to give the bank branch the option of making payments from an account that will not have sufficient funds until the payment arrives, and to request the bank branch to give good value to the payment upon or soon after receipt, instead of waiting the normal length of time required by the branch's standard policies.

A library look-up list feature is available when using the cash management application in the free format mode. The library look-up list provides a number of tables that allow the user to look up information to complete various fields for the cash transaction instruction. The tables available include an account table, a beneficiary table, a bank-to-bank table, and a bank table. The account table displays the bank branch name, account numbers at that branch, and the currency of each account. The beneficiary table displays the names of beneficiaries and their account numbers at the receiving bank. The bank-to-bank table displays information regarding the method of advice, information to parties, payment method, and value date for the beneficiary, depending on the type of transaction involved. The bank look-up table displays data on the different banks through which payments may be channeled. This data includes the bank's name, country code, local clearing code, and S.W.I.F.T. address and CHIPS identification, if applicable. The local clearing code is used to identify the bank to its local clearing system, such as the German Bank Leitzel code, FedWire number, and the UK sort code.

Figure 18:
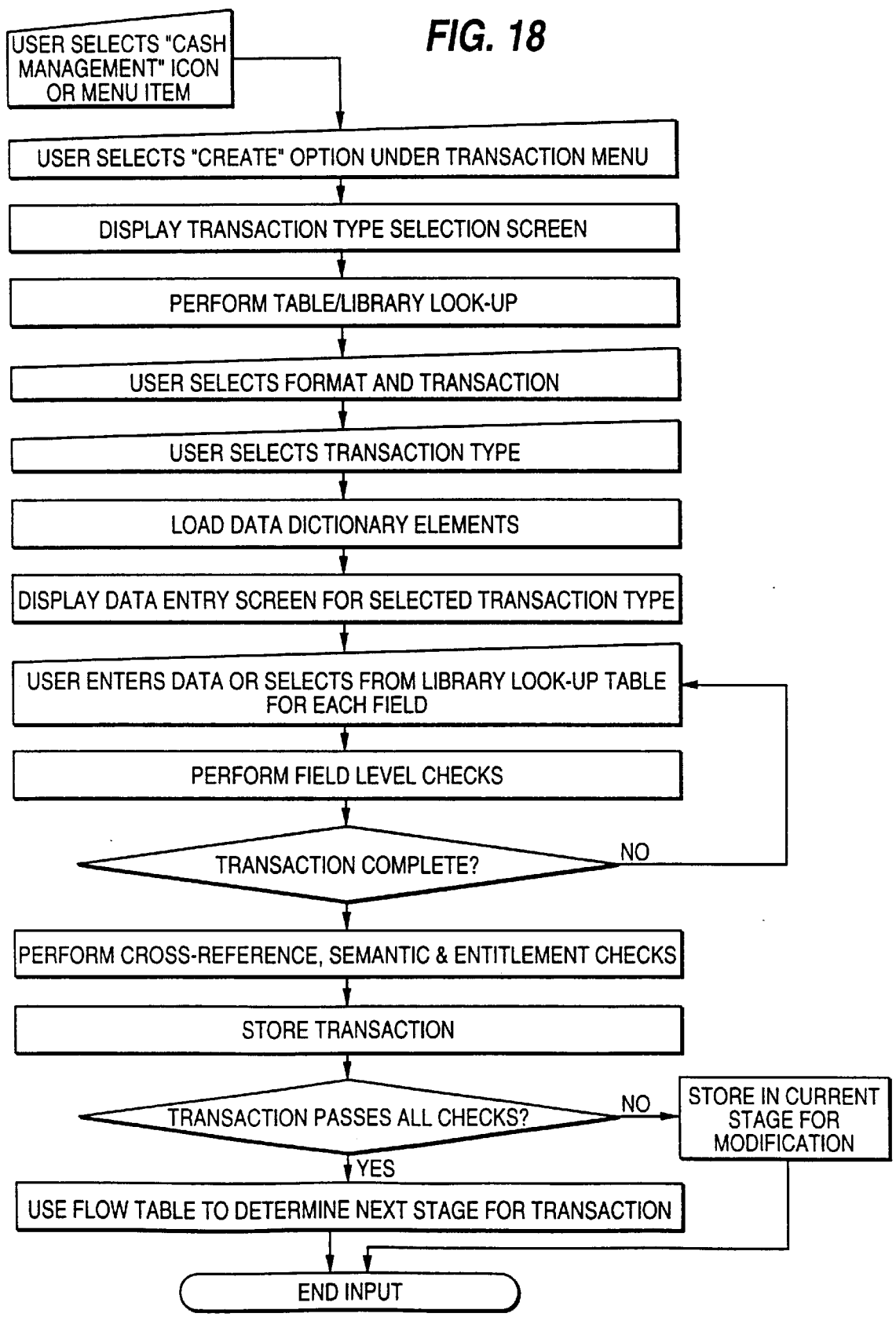
FIG. 18 is a flow chart of a process for inputting a cash management instruction into the customer facility.

FIG. 18 shows the flow process of a user inputting a cash management transaction instruction using the graphic display screens of FIGS. 15 and 17.

The Cash Management application provides two methods of authorizing transactions: summary authorization, and detail authorization. Summary authorization displays a line of information for each transaction awaiting authorization. Detail authorization displays detail information about each transaction awaiting authorization.

Figure 19:
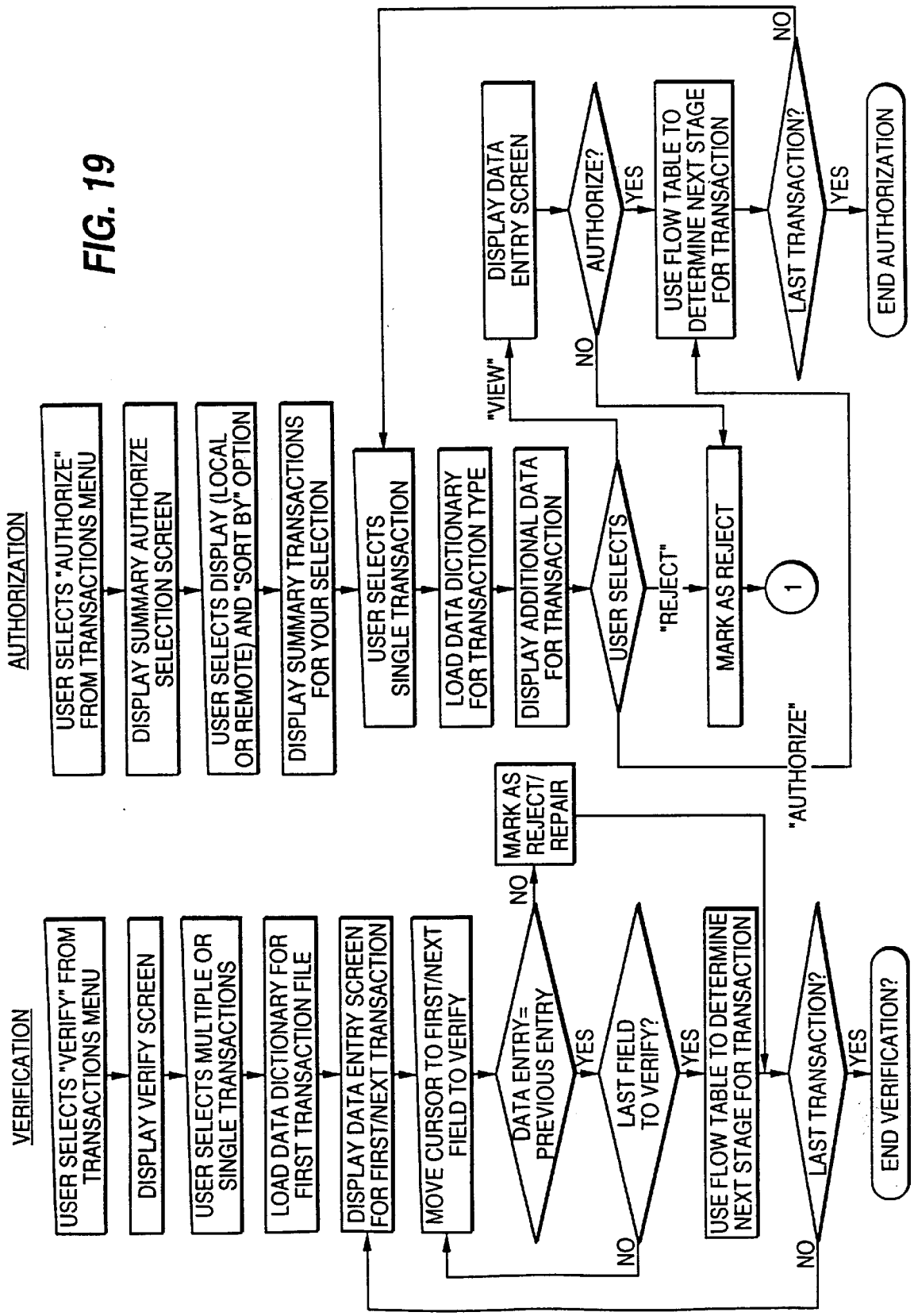
FIG. 19 is a flow chart of a process for verifying and authorizing a cash transaction.

FIG. 19 shows the flow processes of a user verifying and authorizing cash transactions after selecting the cash management application from the main window of FIG. 15.

To authorize a transaction, the Authorize function is selected from the cash management window. The application displays a list of transactions awaiting local or remote authorization (see FIG. 20). A "sort by" box allows the user to sort the list of transactions by type, amount, reference, status, currency, or value date. To authorize a transaction or transactions, the user simply selects the transactions from the list of transactions awaiting authorization. When a transaction is authorized it is automatically released to the communications module of the CF for transmission to the GID 10. Alternatively, the user can reject or delete the transactions awaiting authorization, thereby preventing the transactions from being forwarded to the GID 10.

Normally, the authorizer cannot be the same as the person who prepared or verified the transaction, but it may be a customer requirement that this rule is overridden due to lack of staff at the customer site. A sequence of authorization may be imposed by assigning an authorization sequence to a user in the user's sign-on profile. A particular user may be designated as the initial or final authorizer, or allowed to authorize the transaction regardless of sequence.

Figure 21:
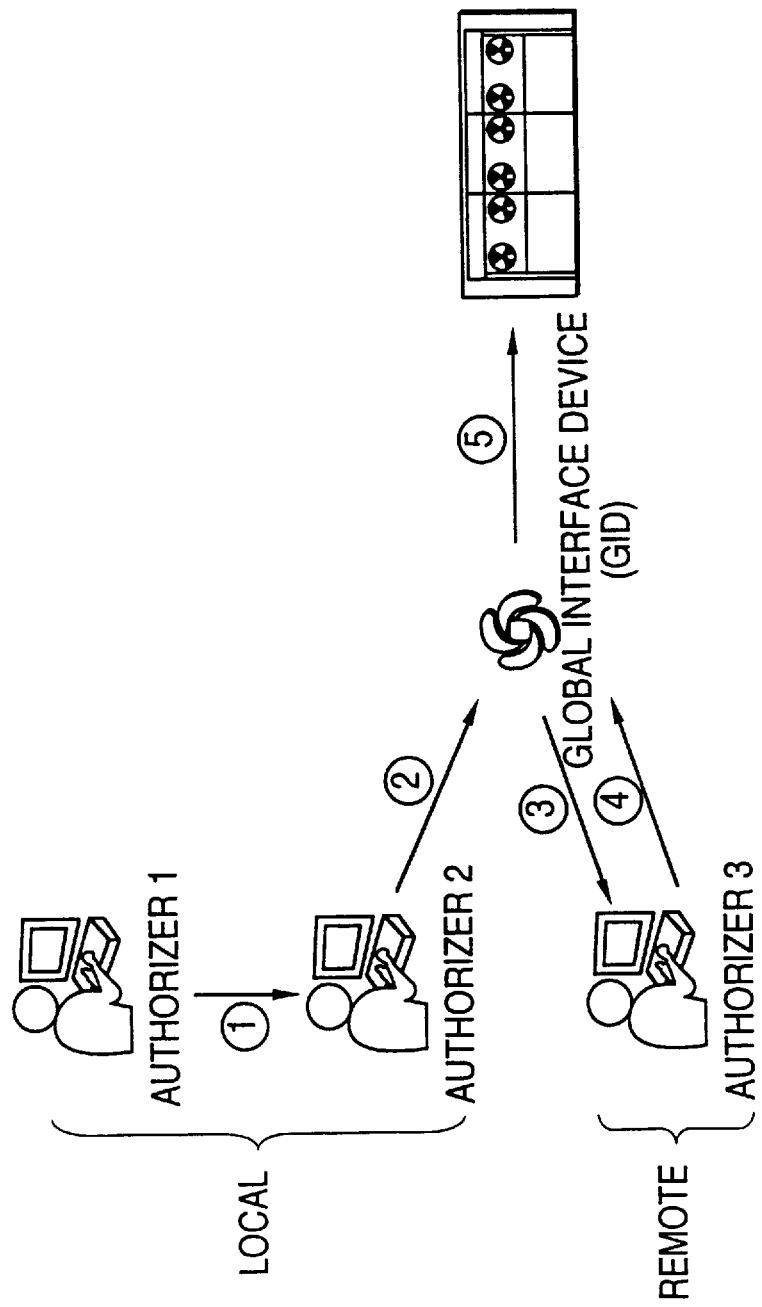
FIG. 21 is a diagram illustrating the flow of local and remote authorizations.

The local authorization described above can be used in combination with the remote authorization provided by the subsystem 19 of the GID 10 to achieve an authorization sequence as shown in FIG. 21. FIG. 21 depicts two local authorizers and one remote authorizer. After the first local authorizer authorizes the transaction, it is available for its second authorization. After the second local authorizer authorizes the transaction, it is transmitted to the GID 10 when a communications link is opened. When the remote location (CF) requests its messages for authorization, the GID 10 transmits the transactions requiring authorization. The remote (third) authorizer can then authorize, reject, or unlock the transaction, as appropriate.

Messages that are authorized by the remote (third) authorizer are sent back to the GID 10 where they are placed on the released queue (if the required number of authorizations have been made) for transmission to the appropriate OLTP 14 as soon as communications are available.

Transactions that are rejected go to the rejected queue in the GID 10 as unauthorized transactions. The GID 10 cancels the transactions and prepares a status message for the transactions' originator indicating the transactions' cancellation. Rejected transactions can no longer be processed.

Transactions that are unlocked are not authorized or rejected. Unlocked transactions are routed to the next remote authorizer who requests them and can be accessed and authorized from other remote locations. If the remote authorizer does not authorize, reject, or unlock transactions within a predetermined time (e.g., two hours) after retrieving the transaction from the GID 10, the GID automatically unlocks the transactions.

Securities Application

Figure 22:
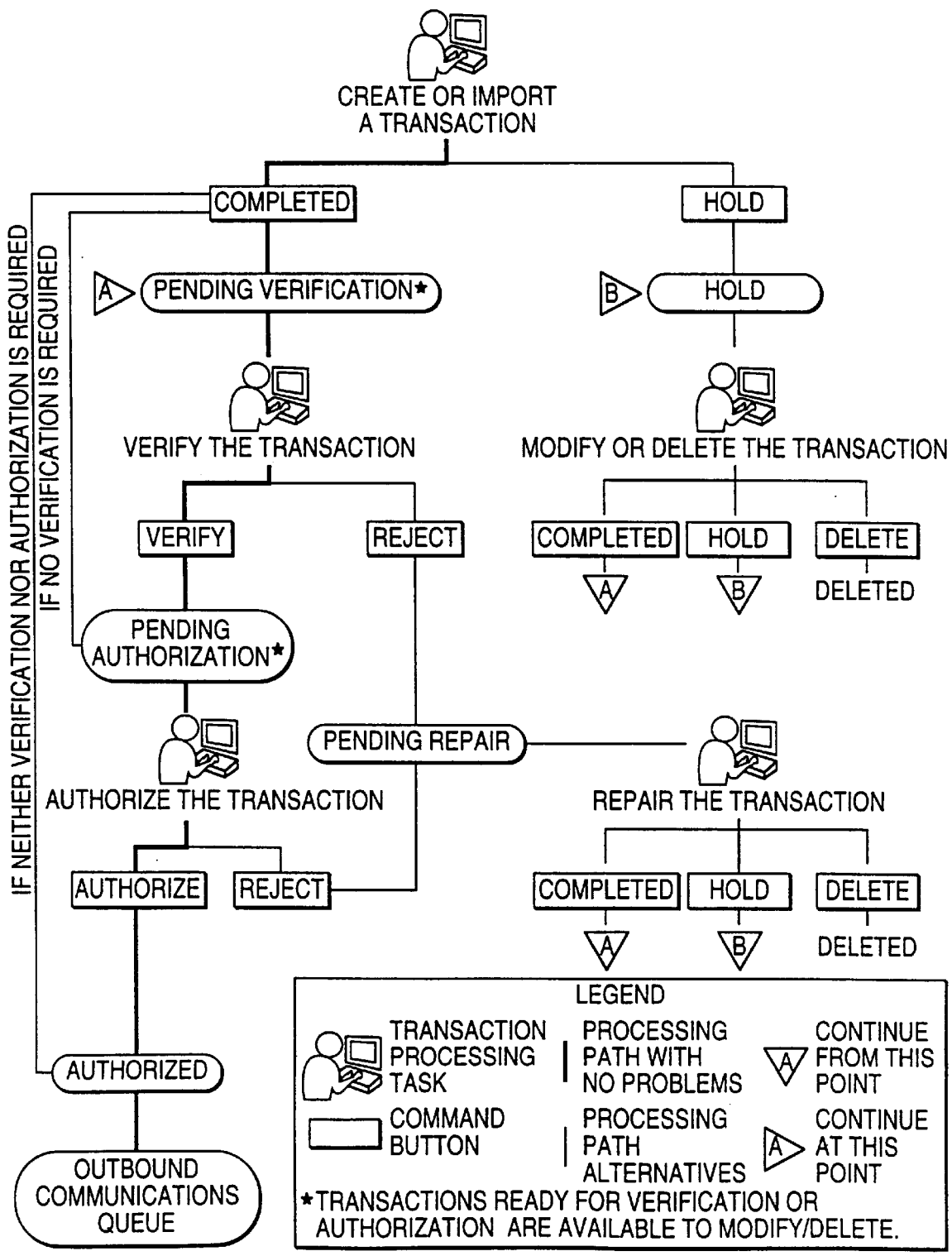
FIG. 22 is a diagram showing the steps for processing a securities transaction at the customer facility.

By selecting the Securities icon or menu item from the main window display shown in FIG. 15, the user can create, verify, authorize, view affirmations, and view all securities transactions, as shown in FIG. 22. The user can also create, verify and authorize a trade instruction. The user can select a number of different portfolios, as well as settlement locations. As with the Cash Management application, each user can perform only one of the create, verify, and authorize functions in the Securities application, as determined by the security manager.

After selecting the Securities application, the application will present a window (see, e.g., FIG. 23) to collect information about the instruction the user wants to create. The window includes a number of lists to help collect information about the instruction, including the transaction type, instrument type, portfolio, custody account, and settlement location.

The transaction type list can include receive versus payment transactions (receiving securities into customer's account against an exchange of cash), receive free transactions (receiving securities into customer's account free of a cash payment), deliver versus payment transactions (delivering securities from customer's account against an exchange of cash), deliver free (delivering a security from customer's account free of a cash payment), and switch transactions (transferring a designated quantity of a security between two identified safekeeping accounts).

The instrument type list can include fixed income bond, Ginnie Mae 1, preferred stock, and equity. The portfolio list can include U.S. securities, direct securities, and global securities. The custody account list can include a variety of U.S. and global custody accounts. The settlement location list can include any location in the world in which the customer does business.

After completing the screen shown in FIG. 23, the user will then be prompted to input additional information about the securities transaction, such as customer reference number, trade date, settlement date, account number, security ID number, security description, broker information, quantity, currency, and so forth (see FIG. 24).

A library look-up list feature is also available in the Securities application. The library look-up list provides a number of tables that allow the user to look up information to complete various fields for the securities transaction instruction.

The Securities application includes a verification feature that can be used to require a second person to confirm that the instruction details are correct. Verification takes place after a transaction is created and before it is authorized. After selecting the Verify function from the Transactions menu, a list of transactions requiring verification are displayed. The transactions are verified merely by selecting the transaction from the list of transactions awaiting verification.

The Securities application provides both summary authorization and detail authorization, similar to the Cash Management application. A "sort by" box in the authorization window allows the user to sort the list of transactions by customer reference number, transaction type, security description, nominal amount, settlement date, status, center, custody account, settlement location, or instrument type. To authorize a transaction or transactions, the user simply selects the transactions from the list of Securities transactions awaiting authorization.

Trade Application

By selecting the Trade icon or menu item, a user can display product information on importers and exporters for two general types of payment alternatives: direct collections and letters of credit. The software generates standard trade reports with summary-level and detail-level information.

Message Retrieval Application

By selecting the Message Retrieval icon or menu item, the user can retrieve undelivered messages from the GID 10, or view messages previously retrieved. The user can select all available messages or limit the messages to those for a particular enterprise. The message retrieval application allows the user to request messages in the following categories: reporting data, transaction acknowledgments and status information, summaries of available messages, demand transactions for viewing and affirmation, and transactions from other sites for authorization. In addition, the message retrieval application can be used to retrieve entitlements information from the GID 10 that indicates the types of information the user can retrieve from the GID and the transactions the OLTPs 14 will accept from the user.

Figure 25:
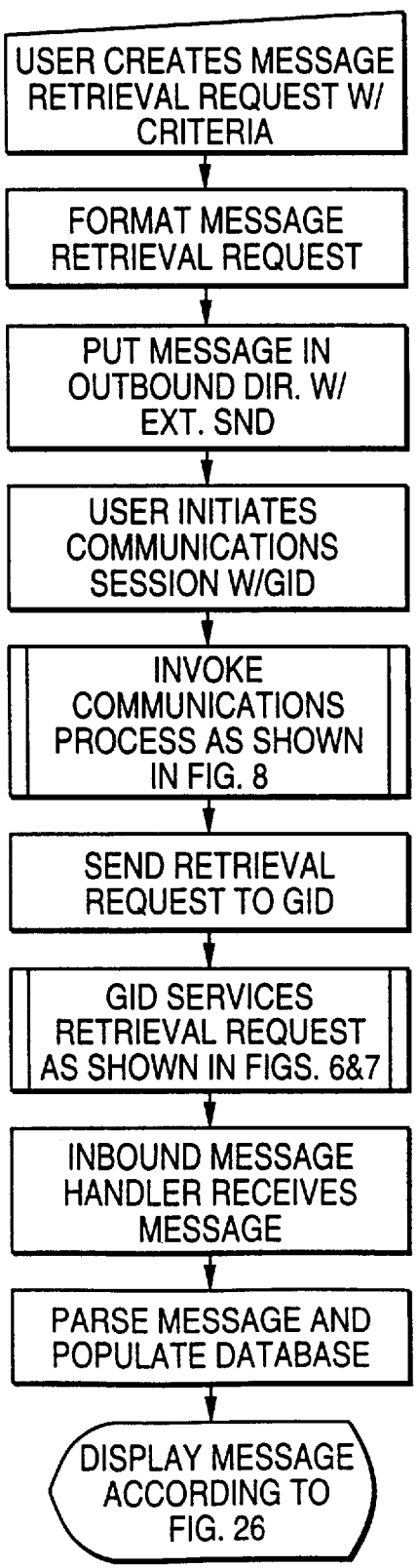
FIG. 25 is a flow chart showing the process of setting up and sending a message retrieval request, and receiving an inbound message in the customer facility.

FIG. 25 illustrates the flow of setting up a message retrieval request, sending the message retrieval request, and receiving a message in the inbound message handler (IMH) of the CF 12. The flow begins by the user creating a message retrieval request using the message retrieval module and entering criteria for the request. The message retrieval request is then formatted and put in the OUTBOUND directory with the extension SND.

Upon initiating a communications session with the GID, the communications process shown in FIG. 8 is invoked by the PC transport software. The message retrieval request is then sent to the GID and serviced as shown in FIGS. 4 and 5.

After servicing by the GID 10, the message is returned to the inbound message handler, parsed, and populated in the database of the CF 12. The retrieved message can then be displayed in a report according to the process shown in FIG. 26, as described below.

Report Viewer Application

By selecting the Report Viewer icon or menu item, a user can produce reports, drill-down to a detail-level report, display criteria selections, and copy information into a word processing package interfaced with the software, such as the word processing program available from Microsoft Corp. under the trademark "WORD", operating in the "WINDOWS" environment. The Report Viewer application is also linked to the Scheduler application, as discussed below.

Each application (i.e., cash management, securities, trade, etc.) includes a number of standard reports that use a variety of ways to organize and present data from the electronic delivery system. The Report Viewer application requires a criteria set to run that defines the scope of the report. Each report can have a default criteria associated with it that defines conventional report organizations, dates, and so forth. The default criteria can be viewed, selected from a list, and modified by the user either for one-time use or to permanently store a new set of defaults for the report.

Figure 26:
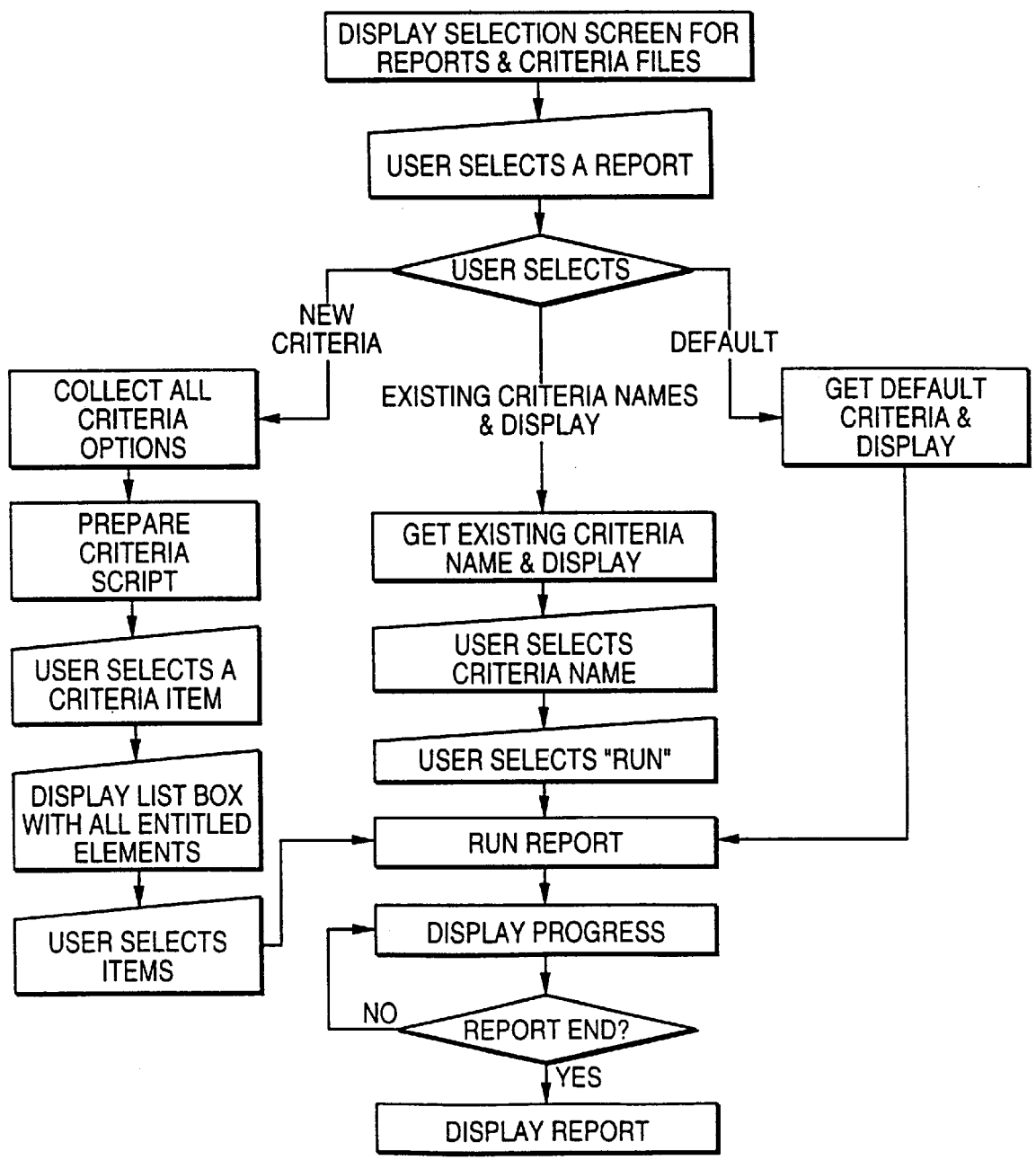
FIG. 26 is a flow chart showing the process for creating a report using the applications software.

FIG. 26 illustrates the flow of selecting and running the Report Viewer application. The report activity is begun by selecting a business type (e.g., all business types, cash, securities, or trade), the name of the report to run, and the criteria for the report. After running the report, the user has a number of additional options, including: reviewing the report by scrolling through the display, linking to another report, copying the report into a word processing application, viewing and editing the selection criteria, running the scheduler function, selecting another report to run, and exiting the Report Viewer application.

Figure 27:
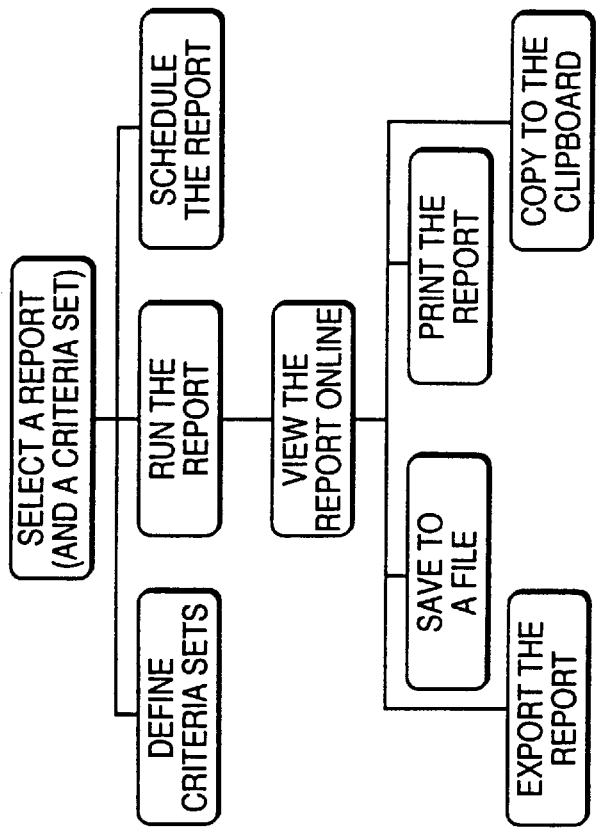
FIG. 27 is a diagram showing the activities available in the Report Viewer application.

FIG. 27 illustrates the three main activities that be performed in the Report Viewer application after a report and criteria set have been selected. When a user runs a report or opens a saved report, it is displayed in a report window. As FIG. 27 shows, once the report is displayed, it can be saved to a file for later viewing, printed, exported as a text file, or copied to the graphics interface software (e.g., using the utility program available from Microsoft Corp. under the trademark "WINDOWS CLIPBOARD") for other uses, such as retrieving the report into a word processing document.

Using the electronic delivery system of the present invention, the Report Viewer application can be used to provide customers with a global view of the customer's cash management, securities, and trade activities, in a single window. For example, the Report Viewer application can be used to create and display securities, trade, and cash management reports all on the same display screen, as shown in FIG. 28.

The Report Viewer application supports a variety of predefined reports to provide the customer with a global picture of the customer's financial activities. Reports relating to cash management include: an Account Balance Export report, an Account Statement report, an Account Statement Details report, an Available & Ledger Balance Summary report, and a Consolidated Available Balances Summary report. Reports relating to securities include an Asset Statement Details report, an Evaluated Assets report, and a Cash Projection report. These reports are briefly described as follows:

The Account Balance Export report formats the data in the Account Statement Details report in a form suitable for export and automatically creates an export file.

The Account Statement report shows summary information on cash transactions moving across an account for each enterprise, branch, and customer, grouped by account number. For each date shown on the report, the report shows the opening balance, the transactions on that date, and the closing balance. For each transaction, the report shows a first line containing a transaction description, the value date, and the transaction amount, and a second line containing the bank reference number and the customer reference number. The report ends with a recap of the number and total amount of debits and credits. Further details of the transaction are available by creating a transaction detail advice report.

The Account Statement Details report shows all information related to each entry in the account statement. The information provided is similar to that provided in the transaction detail advice. For each statement date, the report shows the opening and closing balance, the details of each transaction, and the total number and amount of debits and credits. Within a debit or credit category, details are sorted in ascending order with the largest debit or the smallest credit first.

The Available & Ledger Balance Summary report shows a summary of all accounts with their current ledger balances and opening and current available balances grouped by customer number(s) and branch. For each account, the report shows a first line giving the account number and title, and a second line giving the currency, the last closing balance statement date, and amounts for the current ledger, previous closing balance, funds currently available.

The Consolidated Available Balances Summary report shows a summary of all accounts consolidated by currency for the enterprise, branch, customer, and account. Each line of the report shows a currency, the previous closing balance, and the current available amount. The totals at the bottom of the page are in a predetermined base currency.

The Asset Statement Details report provides a detailed listing of information for each security in a customer account as of the selected report date. The report separates the descriptions of individual securities and provides the following information for each security: identification of the security (i.e., the security ID number type, the security number, and a description of the security), settled and traded amounts (i.e., the quantities of securities traded and settled), the status of settled positions, and pending transactions. For each pending transaction, the report lists the due date, transaction code, the nominal amount, currency and total settlement amount. If there are no pending transactions for the security, the report states "No Pending Positions."

The Evaluated Assets report provides evaluated listings of securities holdings for selected account(s) as of the selected reporting date. The report can be provided in three levels of detail, including a recap level, a summary level, and a detail level. The recap level report provides totals for all postings for the selected date and account(s), as well as the total accrued income, total market value, total book value, unrealized appreciation/loss, and the total value for unevaluated items. The summary level report provides identification and valuation information for each security that meets the selection criteria. The detail level report provides additional information fields, including price date, pool number prefix for MBS securities, amortized units, ticker symbol, book value, rating for the security, and the unrealized profit or loss.

The Cash Projection report provides a listing of anticipated cash flow for selected accounts as of the selected statement date. The report can be provided in three levels of detail, including a recap level, a summary level, and a detail level. The recap level report provides information listings for each day in which there is projected income, including principal and income amounts, total activity and debits, credits, and net amounts for closing balance/net, federal funds, and next day funds. The summary level report provides identification and cash amount information about each projected cash transaction and lists the transactions by the projected date. The detail level report provides additional information items, including class, additional security description lines, broker code, trade, pay, and maturity dates, pool number prefix for MBS securities, current factor, face value, and the interest and dividend rates.

The Reports application is also used to generate trade-related reports, including: an Aging Export Collections report, an Export Collections Outstanding Expanded report, a Letter of Credit ("L/C") Balance Listing report, an L/C Balance Summary report, an L/C Presentation Activity Summary report, and an Activity Detail report.

When completing an international trade sales contract, the importer (buyer) and the exporter (seller) must agree upon the terms of payment. Payment options include payment in advance, open accounts, documentary collections and letters of credit. The Reports application can provide importers and exporters product information on two types of payment alternatives: direct collections and letters of credit. Trade information is reported in tiers, including summary level by informational type, listing by country, and detail level information.

The L/C Balance Listing report provides a daily report of outstanding import letters of credit, sorted by exporter country. This report provides the importer with the exposure of each export country, as well as a list of the letters of credit outstanding with a particular importer.

The L/C Balance Summary report provides importers with all of the outstanding letter of credit balances. This enables the importer to see how much is currently outstanding for each letter of credit, as well as the total outstanding credit amount. The L/C Presentation Activity Summary report displays the payments for import letters of credit.

Messages to Bank

By selecting the Messages to Bank icon or menu item, the user can display a window for creating a free-form message to a bank branch. The messages window provides the starting point for all activities associated with sending free-format messages to a bank branch. Message support may be provided for cash management and securities accounts and trade-related information for a number of bank branches.

The messages window contains: menus for functions available for message processing, setting parameters, and exiting from the application; a tool bar to provide quick access to the principal functions; a summary list to provide information to identify current messages and their status; command buttons active for the processing and items selected; and an information bar to provide information for identifying the current state of the application and the environment.

The messages application contains a summary screen that displays a line of information for each message containing the following fields: business, reference, branch, account, and status. The free format message window is used for creating, modifying, authorizing, and viewing messages. The title of the window and the command buttons change to reflect the function being used.

Report Writer Application

By selecting the Report Writer icon or menu item, the user can design and customize reports in a variety of formats for accounts and information available through the electronic delivery system of the present invention. The Report Writer application is supported by the sort and select functions and has an available link to the Scheduler application.

Access Control Application

Access Control is an application available to the security manager of the customer that allows the manager to manage access to the delivery system via entitlement group profiles. The security manager can open and display characteristics of each of the user groups of the customer. The Access Control application provides the central point for all security management functions within the CFs 12. In addition to entitlement groups, a security manager can set user profiles, restricted passwords, transaction flows, and overall system configuration parameters.

Scheduler Application

By selecting the Scheduler icon or menu item, a user can schedule events, such as message retrievals, reports, end of day processing, on-line backups, and file imports. The Scheduler application allows the user to schedule events, such as cash or securities reports, as a daily, weekly, or monthly report.

Communications Manager

By selecting the Communications Manager icon or menu item, the user can display a communications log, as well as send and receive messages to the GID 10 and the OLTPs 14. The Communications Manager application is used to control the PC-transport communications software for connecting to and disconnecting the CFs 12(1–4) from the GID 10 and to review messages that have been sent and received.

Other Applications

Other applications, besides those discussed above, can also be provided in the CFs 12 to enhance the operation and features obtained with the electronic delivery system. For example, a Library Maintenance application can be provided to maintain and modify a data base of commonly used accounts, customer names, bank branches, etc. An End of Day Processing application can be provided to resolve all outstanding transactions and perform application housekeeping tasks, as well as to clear up the system according to the system configuration parameters. A Banking Terminal application can be provided to communicate with the OLTPs 14 directly (i.e., without routing messages through the GID 10). An Audit Trails application can be provided to track transactions and instruction messages for auditing purposes. And a Help application can be provided to assist users with any questions that arise in using the system.

LAN Facilities

Figure 29:
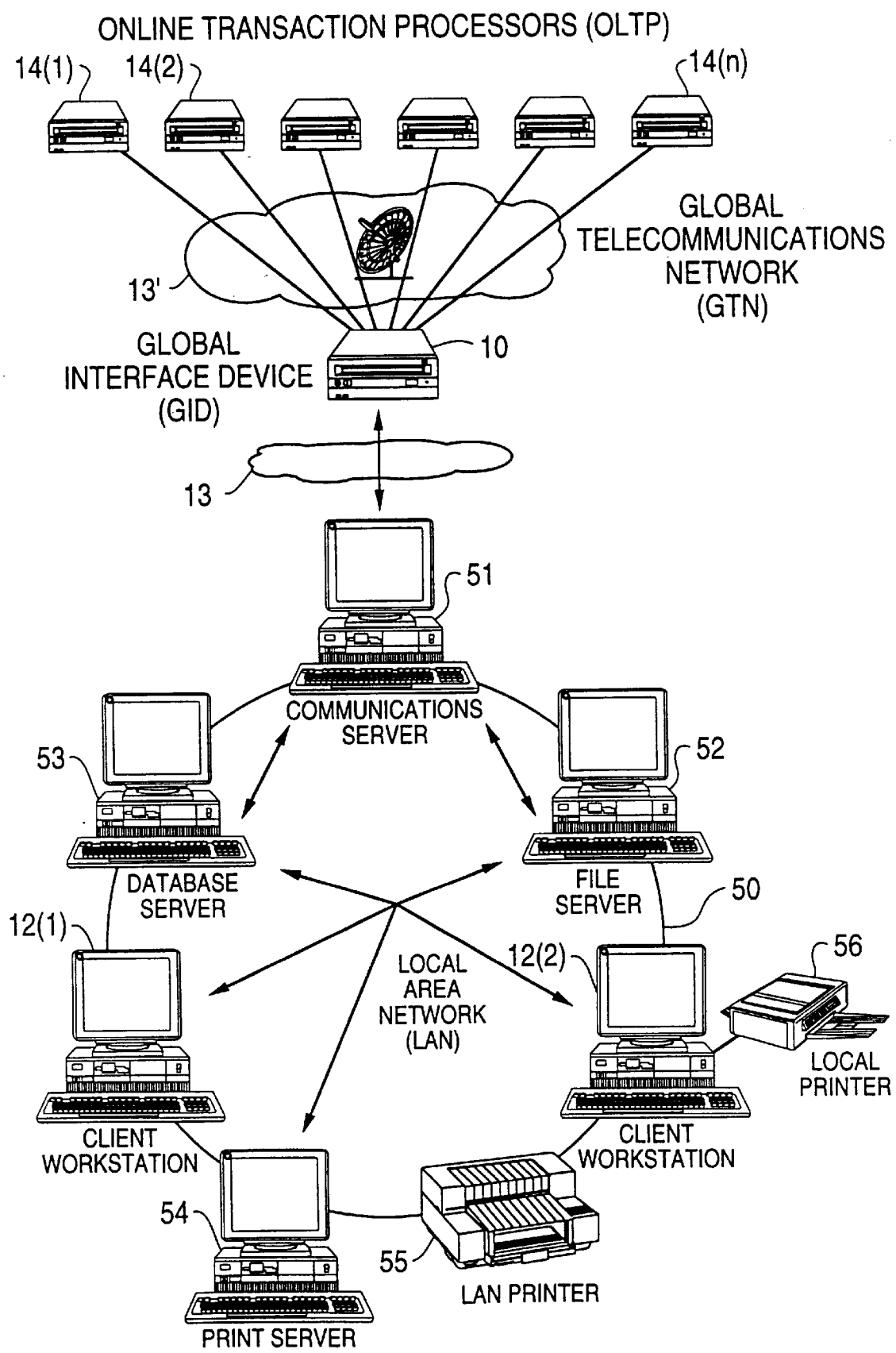
FIG. 29 is a diagram showing the customer facilities arranged in a local area network.

The customer facilities ("CFs") 12 can be incorporated into a local area network ("LAN") 50 to provide the customer with enhanced electronic banking capabilities. As shown in FIG. 29, the LAN facility 50 communicates with the on-line transaction processors (OLTPs) 14(1,2, . . . n) via the global interface device (GID) 10, as in the electronic delivery system described above. The GID 10 communicates with the LAN facility 50 and the OLTPs 14(1, . . . ) through the proprietary, global telecommunications network (GTN) 13, 13'.

The communications link between the GID 10 and the CFs 12(1,2) of the LAN facility is through one modem at any designated workstation on the LAN, or through a dedicated communications server 51 shared by all workstations on the LAN. The LAN installation may have both a communications server 51 and a backup workstation with a modem which can double as the communications server if necessary.

Users initiate transactions to send to the communication server 51 from their workstations 12(1,2), using the software described above. The software is either resident on the hard disks of the workstations 12(1,2) or shared on a central file server 52. The file server 52 contains the system files, a temporary queue for holding messages transmitted to and from the GID 10 (via the communications server 51 or designated workstation), and user workspace files if using diskless workstations. Thus, all users on the LAN must log into the file server 52 before using the system.

The LAN facility stores all data in a central database, either on the file server or on a dedicated database server 53. Users can retrieve the shared information in the database from their workstations 12(1,2). The database server software may, for example, be the database software sold under the tradename "SQLBASE" by the Gupta Corp. for PC networks.

Workstations 12(1,2) on the LAN 50 are used for creating transactions and report requests, and for viewing the requested data. The LAN facility can use either workstations with hard disks or diskless workstations. Once the software is loaded into the workstation's memory (RAM), the workstation can perform communications functions and initiate transactions and reports, as well as retrieve data and personalized report formats.

The LAN 50 may be provided with shared network printers 55 or local printers 56 attached to the user's workstations for printing reports. A dedicated print server may also be provided to handle network printing requests.

The connection among the LAN components is based on the file server 52 mediating between the workstations 12(1, 2) and the database 53, communications server 51, and printers 55 or print servers. For example, in initiating a transaction, the file server 52 first passes a copy of the applications software to the memory of the workstations 12(1,2). The workstation then passes the transaction request to a temporary holding area (e.g., Communications Queues) on the file server 52. At pre-scheduled times, the communications server 51 retrieves accumulated transactions from the temporary holding area of the file server 52 and transmits the requests to the GID 10. Also at pre-scheduled times, the communications server 51 retrieves messages from the GID 10 and safe stores them on the file server 52. The communications server 51 then formats the new data and updates the database of the server 53. The workstations 12(1,2) can then retrieve information from the database server 53 and pre-scheduled reports can be sent from the database server 53 to the printer 55.

The shared resources provided by the LAN facility 50 allow for reduced communications charges, fewer man-hours spent duplicating work, and lowered hardware costs. Shared resources also provide users the opportunity to concurrently access shared data and to work together on single transactions. For example, a customer (e.g., large corporation) may want various users to have access to customized reports created by other users on the LAN, or the customer may want different users to verify or authorize transactions that are initiated by other users before transmitting to the GID 10. The LAN facility allows users to work concurrently and together without leaving their individual workstations.

As information processing needs grow, and with large accounts and many users, more and more disk space is required for storing data for inquiries and reports. The LAN arrangement allows the customer to designate a single PC as a database to store data. Different users on the LAN are given varying degrees of access to the shared data.

The LAN can be set to limit the number of occurrences of specific business applications (i.e., cash management, securities, etc.) on the LAN that can be operating at any one time. This can be used to prevent more than one workstation at a time transmitting information to the GID. The LAN can also restrict the operation of specific applications to particular workstations, thereby affording another level of security to the system.

With the LAN facility, standardized and customized reports and report formats only need to be created once, by any authorized user at any workstation on the LAN, to then be accessible to any other authorized user at any other workstation on the LAN. All users work off of the same shared data that is downloaded just once. Reports may be printed on either local or shared network printers, and data may be exported to other shared network applications.

On the LAN, multiple users may concurrently enter transactions into their own workstations 12(1,2). The LAN facility consolidates these efforts, accumulating transactions from multiple workstations and then making a collective transmission to the GID 10 at pre-scheduled times. Similarly, when information is returned from the GID 10, the LAN facility stores it on a central database for access to all users on the LAN.

In addition, the LAN facility allows one user to enter a transaction on his or her workstation, a second user at another workstation on the LAN to verify the transaction, and still another user to authorize the transaction before it is transmitted to the GID 10.

To prevent users from simultaneously modifying the same transaction, the LAN facility includes a transaction locking mechanism. When a user accesses a transaction, no other users can modify that same transaction until a specified time period expires or until that user is finished with that transaction, whichever comes first. The LAN facilitates data availability by allowing multiple users simultaneous viewing of the shared data, and facilitates data integrity by storing the data in a central location and preventing users from simultaneously modifying the same transaction.

The LAN facility consolidates all transmissions from workstations on the LAN to the GID 10, and messages back from the GID 10 through one central communications server or designated workstation. Centralizing communications allows for reduced hardware charges, in that every PC no longer needs its own modem; and potentially reduced communications charges in that transmissions are consolidated and scheduled for fewer calls.

The LAN facility also allows the users to use the same libraries of files that are used by the various business applications, such as tables containing account numbers, currency codes, or lists of securities. Generally libraries are used for data entry and validation operations: the system offers users choices of standard input based on data in the libraries, and checks users' input for validity against the libraries. The LAN facility stores the libraries centrally, for reduced hardware costs and better control over the data. This scheme allows for greater consistency in that all users refer to the same data (i.e., one user's library update is visible to all other users).

The LAN facility also allows the customer to share network printers among the users for higher quality output for all users on the LAN, without having to purchase expensive printers at each workstation. The LAN facility allows the customer to manage network print jobs through spooled print queues, granting different print requests different priorities. The LAN also allows the user to schedule reports for various times, for example high volume reports might be printed overnight so that the reports will be available when employees arrive at work in the morning.

The LAN facility improves security and workstation administration functions (e.g., maintaining user profiles and entitlements, backup/restore, and startup and end of day procedures) which otherwise have to be repeated for each user on each individual workstation. The LAN allows these functions to be accomplished all at the same time by a single administrator at a single workstation on the LAN. Moreover, the LAN affords another level of security in terms of central storage of programs and data (e.g., diskless workstations). The central storage allows the user to take advantage of additional network security features such as login IDs and passwords for accessing the electronic delivery system software, as well as the physical security of placing file servers and database servers in a central, secured location.

It will be appreciated that the present invention is not limited to the exact construction which has been described above and which is illustrated in the accompanying drawings, and that various modifications and changes can be made without departing from the scope thereof. It is intended that the scope of the invention only be limited by the appended claims.

What is claimed is:

1. A system for delivering financial services, comprising:

a global interface device;

on-line transaction processor facilities located in different geographic locations and time zones wherein said on-line transaction processor facilities provide a plurality of dissimilar computerized financial services including cash management, securities, and trade finance services;

a plurality of customer facilities located in different geographic locations and time zones;

means associated with the on-line transaction processors for generating a plurality of financial messages of a first type for any of the customer facilities;

means associated with said customer facilities for generating a plurality of financial messages of a second type for any of the on-line transaction processors;

means for communicating said first and second type financial messages between the global interface device and the on-line transaction processors, and between the global interface device and the customer facilities;

means associated with said global interface device for storing and queuing financial messages of said first type generated by said on-line transaction processors, wherein messages of said first type may be retrieved at said customer facilities in substantially real time from said on-line transaction processors via said global interface device, and can also be retrieved when said on-line transaction processors are not operational.

2. The system of claim 1, wherein each of said financial messages of said second type contain an address data element for identifying to which processing facility a message is to be delivered.

3. The system of claim 1, said means associated with said global interface device for storing and queuing of said first type messages also stores and queues said messages of said second type that are generated by said customer facilities, wherein said messages of said second type may be retrieved by said on-line transaction processors.

4. The system of claim 3, wherein said means for storing and queuing comprises a repository.

5. The system of claim 1, wherein said customer facilities include an inbound message handler for receiving messages sent to said customer facilities.

6. The system of claim 1, wherein said means for communicating includes a PC transport protocol.

7. The system of claim 1, wherein said means for communicating includes a CPU-CPU protocol.

8. The system of claim 1, wherein at least one of said customer facilities comprise a stand alone workstation.

9. The system of claim 1, wherein at least one of said customer facilities comprises a plurality of workstations arranged in a local area network.

10. The system of claim 9, further comprising a local authorization means for selectively preventing a financial message of said second type from being sent from a first workstation in said local area network until authorized at a second workstation in said local area network.

11. The system of claim 1, further comprising means for providing a first menu structure for selecting any of a plurality of financial services to be delivered.

12. The system of claim 11, further comprising means for deriving a second menu structure in response to a financial service selected from said first menu structure, said second menu structure having data entry fields for inputting data for creating a financial message of said second type.

13. The system of claim 11, further comprising a security means for preventing access to the first menu structure until a valid user identification and password are entered into the computer system.

14. The system of claim 1, further comprising means for encrypting messages sent within the system.

15. The system of claim 1, wherein said financial messages of said first and second types each contain a header portion and a business message portion, said header portion containing a series of defined data elements that identify at least the message type, customer, account, and date.

16. The system of claim 15, wherein each financial message of said second type comprises a transaction instruction message.

17. The system of claim 16, wherein at least one of the financial messages of said second type comprises a product inquiry message.

18. The system of claim 1, wherein said plurality of financial messages of said first type comprise information messages originating from a plurality of different on-line transaction processors located in different geographic locations, each of said financial messages of said first type including a data element which indicates from which on-line transaction processor the messages originated.

19. The system of claim 1, further comprising means for reading machine processable data contained in said financial messages of said first type that are received from the interface device, and said manipulating the machine processable data into a financial report.

20. The system of claim 19, wherein said financial messages of said first type containing information concerning a plurality of different categories of financial services, including cash management, securities, and trade finance services.

21. The system of claim 1, wherein said financial messages of said first type comprise status and event messages.

22. The system of claim 1, wherein said financial messages of said second type comprise transaction instruction messages.

23. The system of claim 22, further comprising means for receiving financial messages from the interface device during a communications session.

24. The system of claim 22, further comprising means for parsing a header of the financial messages received from the interface device and for checking a sequence number of the messages.

25. An electronic delivery system for delivering financial services to a customer at a customer's facility, comprising:

a computer at one of a plurality of customer facilities located in different geographic locations and time zones having means for creating and sending messages, including transaction instruction messages, and means for receiving messages, including status and event messages;

a plurality of on-line transaction processor facilities located in different geographic locations and time zones for providing financial services;

means for generating a plurality of said status and event messages to be sent from said on-line transaction processors;

means for electronically connecting the customer facility to the on-line transaction processor facilities by routing messages from said computer at said customer facility to the on-line transaction processor facilities, via a global interface device, said global interface device comprising means for determining a proper on-line transaction processor facility to route a message to, means for storing the message at least when the proper on-line transaction processor facility is unavailable, means for queuing messages, and means for forwarding the message to the proper on-line transaction processor facility when the proper on-line transaction processor facility becomes available; and means for retrieving said status and event messages at said customer facilities in substantially real time from said on-line transaction processors via said global interface device and means for retrieving said status and event messages when said on-line transaction processors are not operational.

26. The electronic delivery system of claim 25, wherein at least one of said on-line transaction processors is located in a remote location from said customer facility.

27. The electronic delivery system of claim 25, wherein said messages comprise a header portion containing a series of defined data elements that identify at least the message type, customer, account, and date.

28. The electronic delivery system of claim 27, wherein said messages further comprise a business message portion that contains at least one of a transaction instruction, inquiry, status information, and event information.

29. The electronic delivery system of claim 27, wherein said means for electronically connecting the customer facility to the on-line transaction processor facilities includes a remote authorization means for selectively preventing a message sent from a first customer facility from being routed to an on-line transaction processor until at least one authorizing message is received from another customer facility.

30. The electronic delivery system of claim 25, wherein the messages comprise a header portion containing a series of defined data elements that identify at least the message type, customer, account, and date, and the means for retrieving the stored messages comprises means for selectively retrieving only messages having a particular data element in the header portion of the messages.

31. The electronic delivery system of claim 25, whereby customers can conduct financial transactions in multiple geographic locations in different time zones during the customer's normal business hours.

32. The delivery system of claim 25, wherein said on-line transaction processors provide cash management, securities, and trade services.

33. The delivery system of claim 25, wherein a first one of said on-line transaction processors provides at least cash management services, a second one of said on-line transaction processors provides at least securities services, and a third one of said on-line transaction processors provides at least trade finance services.

34. The delivery system of claim 25, wherein a first one of said on-line transaction processors provides financial services for a different geographic region than a second one of said on-line transaction processors.

35. The delivery system of claim 25, wherein said means for electronically connecting comprises a first global interface device having means for routing messages between the customer facility computer and the on-line transaction processors.

36. The delivery system of claim 35, wherein said global interface device has means for receiving and storing messages sent from the on-line transaction processors to the customer facility computer, and means for retrieving and queuing the stored messages to the customer facility computer upon receiving a message retrieval request from the customer facility computer.

37. The delivery system of claim 36, wherein the global interface device has means for checking the construction of messages sent from the customer facility computer to the on-line transaction processors to determine if the messages are in a proper format, and means for checking entitlements to determine if the customer facility computer is entitled to the requested transaction or information; and wherein the global interface device has means for checking the construction of messages sent from the on-line transaction processors to the customer facility computer to determine if the messages are in a proper format, and means for checking entitlements to determine if the on-line transaction processor is entitled to send the messages.

38. The delivery system of claim 25, further comprising means for encrypting the messages sent between the customer facility computer and the on-line transaction processors.

39. A financial system for providing financial services to a plurality of customers, comprising:

a plurality of computers located at customer facilities and operable during each customer's normal business hours, said computers being capable of generating a plurality of transaction instruction messages;

a plurality of on-line transaction processing facilities located in different geographic locations than said customer facilities, said on-line transaction processing facilities being operable during hours which are different than the customer's normal business hours, said processing facilities being capable of generating a plurality of status and event messages;

a global interface device coupled with said plurality of computers at the customer facilities and said plurality of on-line transaction processing facilities, said global interface device comprising means for receiving instructions and inquiries from said computers at said customer facilities, means for receiving status and event messages from said on-line transaction processing facilities, means for storing and queuing said instructions, inquiries, and messages upon receipt in said global interface device, and means for forwarding said instructions and inquiries to one of said on-line transaction processing facilities when said on-line transaction processing facility is operable;

whereby customers can conduct financial transactions in multiple geographic locations in different time zones during the customer's normal business hours; and means for retrieving said status and event messages at said customer facilities in substantially real time from said on-line transaction processors via said global interface device and means for retrieving said messages when said on-line transaction processors are not operational.

40. The financial system of claim 39, further comprising an archiving means for archiving instructions, inquiries, and messages stored in said storing means after a predetermined period of time.

41. A global financial system for providing financial services to a plurality of customers, comprising:

means at individual customers' facilities for requesting any of several different types of financial services from any of a group of different on-line transaction processors located at places geographically separated from the customers' facilities, said means including generating a plurality of transaction instruction messages;

a global interface device located at a position remote from said individual customer's facilities and coupled with said requesting means for recognizing storing and queuing financial services request commands received from said requesting means; and means for coupling said interface means to said on-line transaction processors, said on-line-transaction processors being capable of generating a plurality of status and event messages;

said global interface device including means for checking entitlements to determine if a customer facility sending a request command is entitled to the financial service requested and refusing requests for financial services that a customer facility is not entitled to; and means for retrieving said status and event messages at said customer facilities in substantially real time from said on-line transaction processors via said global interface device and means for retrieving said messages when said on-line transaction processors are not operational.

42. The global financial system of claim 41, wherein said on-line transaction processors include means for generating and sending status and event messages to the global interface device for delivery to the customers' facilities, said global interface device comprising means for checking the construction and entitlements of messages received from said on-line transaction processors to determine if the messages are in a proper format and to determine if the on-line transaction processors are entitled to send the messages, and means for refusing to forward messages having an invalid construction and messages from on-line transaction processors that are not entitled to send the messages.

43. An electronic delivery system for delivering a plurality of financial services from a plurality of on-line transaction processors located in different geographic locations to a customer facility, comprising:

a customer's computer located at said customer facility, said computer being capable of generating a plurality of transaction instruction messages;

a global interface device electronically connected to said customer's computer and to said plurality of on-line transaction processors;

means for establishing a communications session between said customer's computer and said global interface device for sending transaction instruction messages from said computer to said global interface device;

said global interface device comprising means for receiving a plurality of transaction instruction messages from said computer and routing storing and queuing said messages to a plurality of on-line transaction processors in different geographic locations, said on-line transaction processors being capable of generating a plurality of status and event messages; and means for retrieving said messages at said customer facilities in substantially real time from said on-line transaction processors via said global interface device and means for retrieving said messages when said on-line transaction processors are not operational.

44. The electronic delivery system of claim 43, wherein said on-line transaction processors generate and send status and event messages to the global interface device after receiving financial messages from said global interface device, said global interface device having means for storing said status and event messages and a means for allowing the customer's computer to retrieve status and event messages from a plurality of on-line transaction processors in substantially real time from said on-line transaction processors via said global interface device and means for retrieving said status and event messages when said on-line transaction processors are not operational.

45. The electronic delivery system of claim 44, wherein said plurality of on-line transaction processors provide a variety of financial services, including cash management, securities, and trade finance services.

46. The electronic delivery system of claim 43, further comprising means for generating financial reports showing a summary of a customer's financial activities at each of said on-line transaction processors.

* * * * *